(12) United States Patent
Pohl et al.

(10) Patent No.: US 12,526,448 B2
(45) Date of Patent: Jan. 13, 2026

(54) VIDEO FRAME RATE CONVERSION METHOD SUPPORTING REPLACEMENT OF MOTION-COMPENSATED FRAME INTERPOLATION WITH LINEAR COMBINATION OF FRAMES AND DEVICE IMPLEMENTING THE SAME

(71) Applicant: SAMSUNG ELECTRONICS CO., LTD., Suwon-si (KR)

(72) Inventors: Petr Pohl, Moscow (RU); Sergei Dmitrievich Ilichev, Moscow (RU); Igor Mironovich Kovliga, Moscow (RU)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 250 days.

(21) Appl. No.: 18/140,932

(22) Filed: Apr. 28, 2023

(65) Prior Publication Data
US 2023/0353732 A1  Nov. 2, 2023

(30) Foreign Application Priority Data
Apr. 29, 2022 (RU) .............................. 2022111860

(51) Int. Cl.
*H04N 19/553* (2014.01)
*H04N 19/105* (2014.01)
(Continued)

(52) U.S. Cl.
CPC ......... *H04N 19/553* (2014.11); *H04N 19/105* (2014.11); *H04N 19/117* (2014.11);
(Continued)

(58) Field of Classification Search
CPC ................. H04N 7/0127; H04N 7/013; H04N 21/234381; H04N 21/440281;
(Continued)

(56) References Cited

U.S. PATENT DOCUMENTS 8,437,398 B2    5/2013  Shin et al.
9,552,623 B1 *  1/2017  Cheng .................... H04N 7/014
(Continued)

FOREIGN PATENT DOCUMENTS

DE    102018127265 A  *  9/2019  ........... H04N 19/132
EP    2 048 886 A1       4/2009
(Continued)

OTHER PUBLICATIONS

Qingchun Lu et al., "Motion-Compensated Frame Interpolation With Multiframe-Based Occlusion Handling", Journal of Display Technology, vol. 12, Issue No. 1, Jul. 8, 2015, pp. 45-54.
(Continued)

*Primary Examiner* — David N Werner
(74) *Attorney, Agent, or Firm* — Sughrue Mion, PLLC

(57) ABSTRACT

A video frame rate conversion (FRC) method, including obtaining at least one pair of frames of a video; partitioning each frame into a plurality of blocks; estimating motion a block-by-block basis to obtain: a forward motion field including a set of first motion vectors, and a backward motion field including a set of second motion vectors; obtaining occlusions based on the forward motion field and the backward motion field; and calculating an artifact probability metric indicating a probability of an appearance of an artifact in the motion-compensated frame interpolation between the first frame and the second frame.

18 Claims, 15 Drawing Sheets

(51) Int. Cl.
  *H04N 19/117* (2014.01)
  *H04N 19/119* (2014.01)
  *H04N 19/137* (2014.01)
  *H04N 19/139* (2014.01)
  *H04N 19/176* (2014.01)
  *H04N 19/23* (2014.01)
  *H04N 19/86* (2014.01)

(52) U.S. Cl.
  CPC ......... *H04N 19/119* (2014.11); *H04N 19/137* (2014.11); *H04N 19/139* (2014.11); *H04N 19/176* (2014.11); *H04N 19/23* (2014.11); *H04N 19/86* (2014.11)

(58) Field of Classification Search
  CPC .. H04N 19/137; H04N 19/139; H04N 19/553; H04N 19/23
  See application file for complete search history.

(56) References Cited

U.S. PATENT DOCUMENTS

| | | | |
|---|---|---|---|
| 10,219,000 B1* | 2/2019 | Cheng | H04N 7/0127 |
| 2004/0037471 A1* | 2/2004 | Laurent-Chatenet | H04N 19/537 |
| | | | 375/E7.263 |
| 2004/0091047 A1* | 5/2004 | Paniconi | G06T 7/215 |
| | | | 375/E7.111 |
| 2007/0268965 A1 | 11/2007 | Alfonso et al. | |
| 2008/0095239 A1 | 4/2008 | Lim et al. | |
| 2008/0101472 A1 | 5/2008 | Jeon et al. | |
| 2008/0239143 A1* | 10/2008 | Shin | G06T 3/4038 |
| | | | 382/300 |
| 2008/0278633 A1* | 11/2008 | Tsoupko-Sitnikov | G06T 7/238 |
| | | | 348/E5.062 |
| 2009/0110075 A1* | 4/2009 | Chen | H04N 19/523 |
| | | | 375/240.16 |
| 2009/0263033 A1* | 10/2009 | Weston | H04N 19/895 |
| | | | 382/307 |
| 2010/0128169 A1 | 5/2010 | Yi et al. | |
| 2011/0211125 A1* | 9/2011 | Petrides | H04N 19/513 |
| | | | 348/616 |
| 2011/0294544 A1* | 12/2011 | Liang | H04N 19/51 |
| | | | 348/240.99 |
| 2012/0033130 A1 | 2/2012 | Piek | |
| 2012/0328025 A1* | 12/2012 | Chang | H04N 19/51 |
| | | | 375/E7.125 |
| 2013/0072299 A1* | 3/2013 | Lee | H04N 19/513 |
| | | | 463/32 |
| 2014/0294320 A1* | 10/2014 | Kokaram | H04N 19/597 |
| | | | 382/300 |
| 2015/0078559 A1* | 3/2015 | Ilango | G10K 11/17854 |
| | | | 381/59 |
| 2015/0294479 A1* | 10/2015 | Kovacevic | G06F 18/22 |
| | | | 382/103 |
| 2016/0165246 A1* | 6/2016 | Nagumo | H04N 19/117 |
| | | | 375/240.25 |
| 2016/0366367 A1 | 12/2016 | Chen et al. | |
| 2018/0020229 A1* | 1/2018 | Chen | H04N 19/132 |
| 2018/0132009 A1* | 5/2018 | Ivanovic | H04N 19/00 |
| 2018/0176574 A1* | 6/2018 | Tang | H04N 19/543 |
| 2019/0261000 A1* | 8/2019 | Oh | H04N 19/146 |
| 2020/0244884 A1* | 7/2020 | Baek | H04N 5/04 |
| 2020/0296386 A1* | 9/2020 | Giladi | H04N 19/132 |
| 2022/0270267 A1* | 8/2022 | Ye | H04N 7/0127 |

FOREIGN PATENT DOCUMENTS

| | | | | |
|---|---|---|---|---|
| EP | 2237559 A1 * | 10/2010 | | H04N 19/176 |
| EP | 2237560 A1 * | 10/2010 | | H04N 19/553 |
| KR | 10-1107256 B1 | 1/2012 | | |
| RU | 2 602 792 C2 | 11/2016 | | |
| RU | 2 747 965 C1 | 5/2021 | | |
| WO | 2008/085533 A2 | 7/2008 | | |
| WO | 2012/101542 A1 | 8/2012 | | |
| WO | WO-2016036295 A2 * | 3/2016 | | H04N 19/132 |
| WO | 2022/075688 A1 | 4/2022 | | |

OTHER PUBLICATIONS

Seung-Ho Park et al., "Advanced local fallback processing for motion-compensated frame rate up-conversion", 2012 IEEE International Conference on Consumer Electronics (ICCE), Jan. 2012, pp. 467-468.

Communication (Search Report) issued by the Russian Patent Office on Dec. 1, 2022 in Russian Patent Application No. 2022111860.

Communication (Decision on Grant) issued by the Russian Patent Office on Dec. 1, 2022 in Russian Patent Application No. 2022111860.

Olukayode Anthony Ojo et al., "Robust Motion-Compensated Video Upconversion", Phillips Research Laboratories, Television Systems Group, Prof. Holstlaan 4, 5656 AA Eindhoven, The Netherlands, Jun. 1997, 12 pages total.

* cited by examiner

MOTION ESTIMATION METRIC (RESULT OF STEP S104)

VIDEO FRAME RATE CONVERSION METHOD SUPPORTING REPLACEMENT OF MOTION-COMPENSATED FRAME INTERPOLATION WITH LINEAR COMBINATION OF FRAMES AND DEVICE IMPLEMENTING THE SAME

CROSS-REFERENCE TO RELATED APPLICATION(S)

This application claims priority under 35 U.S.C. § 119 to Russian Patent Application No. 2022111860, filed on Apr. 29, 2022, in the Russian Federal Service for Intellectual Property, the disclosure of which is incorporated by reference herein in its entirety.

BACKGROUND

1. Field

The disclosure relates to video processing, and more particularly to frame rate conversion (FRC) supporting replacement of motion-compensated frame interpolation with linear combination of frames.

2. Description of Related Art

Frame rate conversion is the task of temporal interpolation of video frames to change the video frame rate measured in frames per second (FPS). Depending on the required objective FRC may increase or decrease FPS. FRC that increases FPS is the basic technology to ensure smooth playback of regular content, such as user videos, movies or games. Currently, FRC is widely used in the 'Super Slow Motion' (SSM) and 'Single Take' (STK) modes. In addition, currently, the possibility of using FRC is being considered for other use cases, such as video telephony and dynamic gallery preview mode.

Nevertheless, any FRC algorithm may, in some situations, lead to the appearance of artifacts on the processed images. Therefore, it would be helpful to provide FRC-method that supports fallback (reserve) logic, thanks to which it will be possible to estimate the probability of appearance of artifacts due to motion-compensated frame interpolation of adjacent frames and, if the estimated probability is high, replace the motion-compensated frame interpolation with a linear combination of adjacent reference frames. Linear combination is not such a computationally complex operation as motion interpolation, because motion vectors are not taken into account when calculating it.

On the other hand, excessive use of a linear combination when performing FRC, a special case of which is a simple repetition of the nearest reference frame, leads to a non-smooth display of images during video playback. Thus, it would be desirable to provide a trade-off between non-smooth playback due to linear combination of frames and potential artifacts due to motion-compensated frame interpolation.

The known FRC-methods are either overly simplified, which leads to excessive use of a linear combination or to appearance of significant artifacts on the processed images, or too computationally complex, which makes it impossible to implement them on devices with limited resources in real time.

Known from prior art is the publication of Seung-Ho Park, Tae-Gyoung Ahn, Se-Hyeok Park, Jae-Hyun Kim, entitled: 'Advanced local fallback processing for motion-compensated frame rate up-conversion', Jan. 13-16, 2012, Las Vegas, Nevada. This publication discloses FRC-method supporting local fallback processing. In said publication, the decision on the need to use motion-compensated frame interpolation or linear combination is made based on motion clustering and motion trajectory analysis in a number of video sequence frames. The main disadvantages of this solution are the high computational complexity and inaccuracy of the decision made due to the appearance of rapidly changing/nonlinear motion in the processed images. Another disadvantage of the disclosed solution is the time delay caused by the need to receive one or more future frames in addition to the pair of frames currently processed by the FRC.

Known from prior art is the patent application published as US2015294479 A1 of 15.10.2015, entitled 'Fallback detection in motion estimation', Vladimir Kovacevic, Zdravko Pantic, Aleksandar Beric, Milos Markovic, Vladimir Ilic. This patent document discloses an algorithm for controlling motion estimation in video processing, which uses phase correlations of images and classifies motions and correlation states based on inflexible rules: fast/slow motion and high/low correlation. The disadvantages of this algorithm are also the high computational complexity due to the need to determine the phase correlations of images and the inaccuracy of the decision being made, because inflexibly established rules cannot be optimal for the entire spectrum of possible images. In addition, this solution does not provide for the possibility of detecting favorable conditions (for example, the moment in time, coordinates in the frame in which the mentioned replacement is required) for being performed and performing local fallback processing itself, in which the replacement of motion-compensated frame interpolation with linear combination of reference frames is carried out partially/locally.

SUMMARY

Provided are technical solutions which may increase the accuracy of detecting possible artifacts and other image defects (for example, "freezes", "twitches") arising from FRC. As a result, the accuracy of decision-making in a given situation may increase, whether to perform partial or complete replacement of motion-compensated frame interpolation with linear combination of adjacent reference frames. Advantageously, this adaptive approach may provide a trade-off between the non-smooth playback that may result from performing operations of linear combination of frames and the potential artifacts that may result from motion-compensated frame interpolation.

Embodiments may be suitable for real-time implementation on devices with limited resources, because most of the data processing is performed on a block-by-block basis. Additionally, computationally complex operations, in cases where they are expected to lead to the appearance of artifacts in motion-interpolated images, may be completely or partially replaced by less computationally complex operations, which further contributes to the suitability of embodiments for real-time implementation on devices with limited resources. Other technical advantages of embodiments and the problems solved will become more apparent in view of the following detailed description.

Additional aspects will be set forth in part in the description which follows and, in part, will be apparent from the description, or may be learned by practice of the presented embodiments.

In accordance with an aspect of the disclosure, a video frame rate conversion (FRC) method supporting partial or complete replacement of motion-compensated frame interpolation with a linear combination of adjacent reference frames includes obtaining at least one pair of frames of a video which are subject to FRC: partitioning each frame of the at least one pair of frames into a plurality of blocks: estimating motion between the at least one pair of frames on a block-by-block basis to obtain: a forward motion field including a set of first motion vectors, wherein each first motion vector from among the set of first motion vectors corresponds to a first block from among a plurality of first blocks of a first frame of the at least one pair of frames, and points to a corresponding area in the second frame, and a backward motion field including a set of second motion vectors, wherein each second motion vector from among the set of second motion vectors corresponds to a second block from among a plurality of second blocks of a second frame, and points to a corresponding area in the first frame, and wherein the each first motion vector the each second motion vector is assigned a corresponding value of a motion estimation metric, the first frame preceding the second frame in time: obtaining occlusions including covered occlusions, uncovered occlusions, and inconsistent occlusions based on the forward motion field and the backward motion field: calculating an artifact probability metric indicating a probability of an appearance of an artifact in the motion-compensated frame interpolation between the first frame and the second frame, wherein the calculating includes: detecting breaks between spatially adjacent motion vectors in at least one of the forward motion field and the backward motion field, processing the breaks by suppressing breaks which overlap only with the uncovered occlusions for breaks in the backward motion field or only with the covered occlusions for breaks in the forward motion field, and amplifying breaks which overlap with the inconsistent occlusions, and suppressing the breaks between the spatially adjacent motion vectors based on values of the motion estimation metric, performing smoothing filtering on the artifact probability metric, and obtaining one or more intermediate frames based on values of the smoothed artifact probability metric.

Based on a maximum value of the smoothed artifact probability metric being greater than or equal to a predetermined global threshold value, the obtaining of the one or more intermediate frames may include performing a global linear combination of the adjacent reference frames.

Based on a maximum value of the smoothed artifact probability metric being less than a predetermined global threshold value, the obtaining of the one or more intermediate frames may further include performing motion-compensated interpolation of the adjacent reference frames.

Based on determining that the motion-compensated interpolation of the adjacent reference frames is to be performed, the method may further include: determining a number of at least some blocks of the adjacent reference frames having smoothed artifact probability metric values which are less than a predetermined local threshold value corresponding to a maximum value of the artifact probability metric which is permissible to use with a local linear combination: based on the number of the at least some blocks not exceeding a predetermined maximum number of blocks which are permissible to use with the local linear combination, performing a local linear combination for at least some blocks of the adjacent reference frames, wherein the predetermined local threshold value is less than the predetermined global threshold value.

Based on determining that the motion-compensated interpolation of the adjacent reference frames is to be performed, the method may further include: performing a local linear combination as a weighted sum of an intermediate frame obtained by motion interpolation of the at least one pair of frames and the linear combination of the at least one pair of frames, wherein weights for each block are calculated based on the values of the smoothed artifact probability metric.

Based on the estimating the motion between the at least one pair frames on the block-by-block basis, the motion estimation metric may further include a similarity characteristic between pixels of a block of one frame and pixels of a corresponding area of another frame, wherein the motion estimation metric may further include a mean absolute difference (MAD) or a sum of absolute differences (SAD), and wherein lower SAD or MAD values correspond to a higher accuracy of the motion estimation metric.

The obtaining of the occlusions may further include: initializing a map of the uncovered occlusions and a map of the covered occlusions corresponding to the at least one pair of frames: for each first block of the plurality of first blocks of the first frame, moving a corresponding block based on a first motion vector determined for the each first block to the second frame and excluding all pixels of the second frame covered by the movement in the map of the uncovered occlusions, wherein remaining pixels of the second frame which are not covered in the map of the uncovered occlusions specify the uncovered occlusions: for each second block of the plurality of second blocks of the second frame, moving a corresponding block based on a second motion vector determined for the each first block to the first frame and excluding all pixels of the first frame covered by the movement in the map of the covered occlusions, wherein remaining pixels of the first frame which not covered in the map of the covered occlusions specify the covered occlusions: constructing a map of inconsistent occlusions, in which pixels simultaneously belonging to both the uncovered occlusions and the covered occlusions based on the map of the uncovered occlusions and the map of the covered occlusions are specified as the inconsistent occlusions; and block-wise aggregating information about the uncovered occlusions, the covered occlusions, and the inconsistent occlusions.

The obtaining of the occlusions may further include receiving information about the occlusions, including the uncovered occlusions, the covered occlusions, and the inconsistent occlusions, which are found based on the forward motion field and the backward motion field, from an external occlusion detection unit.

The processing of the breaks may further include: multiplying a corresponding value of the artifact probability metric by a weighting factor having a range [0,1], a value of which decreases based on a covered occlusion being detected and increasing with an increase in a number of the inconsistent occlusions and a decrease in a number of the covered occlusions.

The processing of the breaks may further include: multiplying a corresponding value of the artifact probability metric by a weighting factor having a range [0,1], a value of which decreases based on an uncovered occlusion being detected and increases with an increase in a number of the inconsistent occlusions and a decrease in a number of the uncovered occlusions.

The suppressing of the breaks may further include: multiplying a corresponding value of the artifact probability metric by a weighting factor having a range [0,1] which decreases as a maximum value of the values of the motion estimation metric in a considered pair of motion vectors increases, reaching a value zero based on a first predetermined threshold value of the motion estimation metric being reached, and increases as the maximum value of the values of the motion estimation metric in the considered pair of motion vectors decreases, reaching a value of one based on a second predetermined threshold value of the motion estimation metric being reached.

The method may further include determining a weighting factor adaptive to frame resolution and using the weighting factor to amplify detected breaks between spatially adjacent motion vectors.

The smoothing filtering on the artifact probability metric may be performed by a digital filter having a filter size determined adaptively based on a frame resolution.

The smoothing filtering on the artifact probability metric may be performed by a digital filter having a filter size determined adaptively based on a predetermined minimum size of detectable artifact.

The calculating of the artifact probability metric may further include suppressing the breaks which are included in frame blocks located at a distance from a frame boundary, which is less than a predetermined distance from the frame boundary in blocks.

The breaks may be detected for vertically spatially adjacent blocks of the frame or for horizontally spatially adjacent blocks of the frame.

The breaks may be detected for vertically spatially adjacent blocks of the frame and for horizontally spatially adjacent blocks of the frame.

The artifact probability metric may be at least partially calculated using a Heaviside function.

In accordance with an aspect of the disclosure, a device for performing video frame rate conversion (FRC) supporting partial or complete replacement of motion-compensated frame interpolation with a linear combination of adjacent reference frames includes a processor configured to execute stored instructions, to: obtain at least one pair of frames of a video which are subject to FRC: partition each frame of the at least one pair of frames into a plurality of blocks: estimate motion between the frames on a block-by-block basis to obtain: a forward motion field including a set of first motion vectors, wherein each first motion vector from among the set of first motion vectors corresponds to a first block from among a plurality of first blocks of a first frame of the at least one pair of frames, and points to a corresponding area in the second frame, and a backward motion field including a set of second motion vectors, wherein each second motion vector from among the set of second motion vectors corresponds to a second block from among a plurality of second blocks of a second frame, and points to a corresponding area in the first frame, and wherein the each first motion vector the each second motion vector is assigned a corresponding value of a motion estimation metric, the first frame preceding the second frame in time: obtain occlusions including covered occlusions, uncovered occlusions, and inconsistent occlusions based on the forward motion field and the backward motion field: calculate an artifact probability metric indicating a probability of an appearance of an artifact in the motion-compensated frame interpolation between the first frame and the second frame, wherein the calculating includes: detecting breaks between spatially adjacent motion vectors in at least one of the forward motion field and the backward motion field, processing the breaks by suppressing breaks which overlap only with the uncovered occlusions for breaks in the backward motion field or only with the covered occlusions for breaks in the forward motion field, and amplifying breaks which overlap with the inconsistent occlusions, and suppressing the breaks between the spatially adjacent motion vectors based on values of the motion estimation metric, performing smoothing filtering on the artifact probability metric, and obtaining one or more intermediate frames based on values of the smoothed artifact probability metric.

BRIEF DESCRIPTION OF THE DRAWING

The above and other aspects, features, and advantages of certain embodiments of the present disclosure will be more apparent from the following description taken in conjunction with the accompanying drawings, in which.

It should be understood that the figures can be represented schematically and not in scale and are intended mainly to improve the understanding of embodiments.

DETAILED DESCRIPTION

Figure 1:
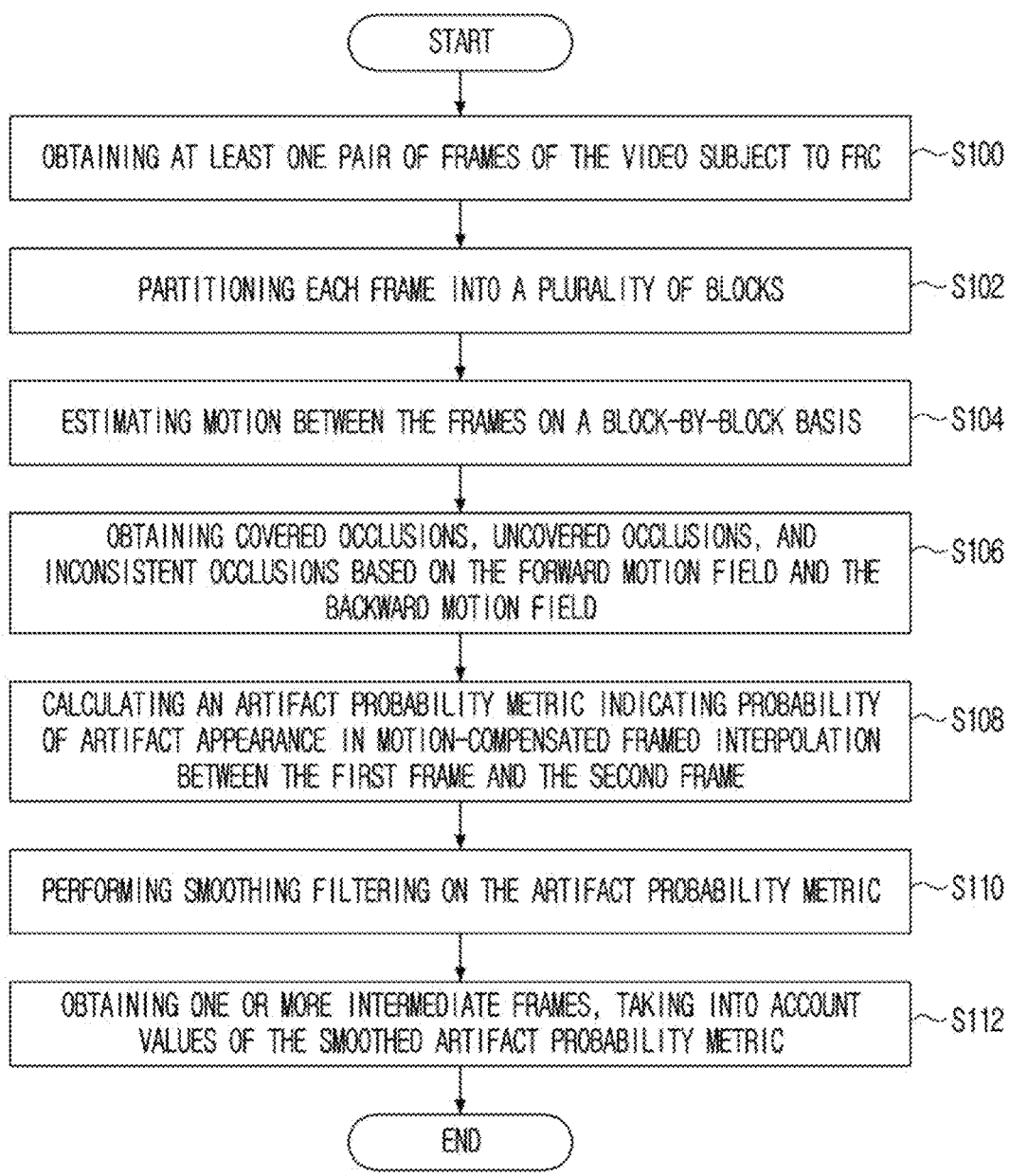
FIG. 1 illustrates a flowchart of a video FRC-method according to an embodiment.

FIG. 1 illustrates a flowchart of the video FRC-method according to embodiments. The method begins with step S100, at which at least one pair of source frames of the input video subject to FRC is obtained. The video can be of any quality/resolution and can be obtained in any way, for example, but without the limitation, downloaded from the Internet or any other information and communication network using any communication technology (for example, Wi-Fi, 3G, 4G, 5G, Bluetooth, Near field communication etc.). In another embodiment, the video can be captured by the camera, stored in the device's memory, and then it can be accessed by the FRC unit in the processor to perform FRC on it. In other embodiments, the input video comprising the source frames may come from an image processor or a video decoder. The source frames are time-adjacent frames that are closest to a position in time at which an intermediate frame will be generated during FRC. These source frames may also be referred to as reference/key frames.

After receiving at least one pair of video frames, the method proceeds to step S102, at which each source frame of said at least one pair of video frames is partitioned into a plurality of blocks. Any frame partitioning scheme can be used. As an example, but not the limitation, frames can be partitioned into 8×8 luma blocks that make up a macroblock in Advanced Video Coding (AVC). However, embodiments are not limited to 8×8 luma blocks in AVC, because any other types of blocks (for example, CTU) used in other video coding standards, for example, in High Efficiency Video Coding (HEVC, H.265) and in Versatile Video Coding (VVC, H.266), can be used. Therefore, the size of the blocks into which frames can be partitioned at this step should not be limited to the 8×8 size specified above, because other sizes are applicable as well, for example, 16×16, 32×32, 64×64, as well as rectangular sizes.

The step S102 of partitioning frames into blocks provides the possibility of performing subsequent steps on a block-by-block basis. When performing steps on a block-by-block basis, a value of any variable associated with a single block is assumed to be the same for all pixels inside this block. This approach makes it possible to process information not from each pixel, but only from each block, which leads to a significant reduction in the amount of processed data compared to fully pixel-by-pixel processing. As noted above, performing most of the data processing on a block-by-block basis may allow embodiments to be suitable for real-time implementation on devices with limited resources.

After the frames are partitioned into blocks, the method proceeds to step S104, at which motion is estimated between the frames on a block-by-block basis. With this motion estimation, the forward motion field ($D_{FW}$ in FIG. 8) and the backward motion field ($D_{BW}$ in FIG. 8) are obtained. The forward motion field is a set of motion vectors, each of which corresponds to a respective block from the plurality of blocks of the first frame and points to a corresponding area in the second frame. The backward motion field is a set of motion vectors, each of which corresponds to a respective block from the plurality of blocks of the second frame and points to a corresponding area in the first frame. FIG. 4B illustrates graphical representations of forward and backward motion fields, which are obtained for a certain pair of frames of the processed video. The white areas in FIG. 4B correspond to those areas in which there is no motion. Different shades of gray in other areas in FIG. 4B correspond to different motion vectors of different blocks that were obtained as the result of motion estimation.

Thus, the motion estimation (ME) algorithm generates a motion vector for each block of the first frame, which points to a corresponding area of the second frame. It should be noted here that the 'corresponding area of the second frame' has the same size as the corresponding block of the first frame, whose motion vector points to it, but this corresponding area of the second frame may not be strictly in the grid of blocks of the second frame. In other words, the 'corresponding area of the second frame' may include one or more boundaries between two or more blocks in the grid of blocks of the second frame, which were obtained by partitioning at the step S102. The first frame and the second frame are the frames obtained and processed in the previous steps, with the first frame preceding the second frame in time.

A motion vector (MV) is an offset between a block of one frame and a corresponding area of another frame in the form of two coordinates: horizontal and vertical. This offset can have both pixel precision and fractional pixel precision. A motion field is a set of motion vectors, where each of the motion vectors corresponds to either each pixel (dense motion field), or a block of pixels (usually a square or rectangle of adjacent pixels) of the frame. In embodiments, motion vectors belonging to blocks are used, thus block-based motion fields are used. For example, if a frame of 720×1280 pixels is partitioned into blocks of 8×8 pixels each, then the frame size is 90×160 blocks, and that is exactly the number of motion vectors the motion field for such a frame has.

Motion vectors point to some corresponding area of another frame. The motion field always implies the presence of two frames—the current one and some other one (for example, the next one in time or the previous one in time). The following designations correspond to the designations shown in FIG. 8, to which the additional reference is currently being made to illustrate the following explanations. If the frames captured by the camera are numbered in ascending order, then for a pair of frames $F_N$ and $F_{N+1}$, the forward motion field $D_{FW,N}$ will be a set of motion vectors for the current frame $F_N$, which point to corresponding areas of the other frame $F_{N+1}$ (a compensated frame can be obtained by a simple motion compensation algorithm). The backward motion field $D_{BW,N}$ will be a set of motion vectors for the current frame $F_{N+1}$, which point to corresponding areas of the other frame $F_N$ (a compensated frame can be obtained by a simple motion compensation algorithm). In embodiments, both of these motion fields can be the result of the operation of the motion estimation algorithm for frames $F_N$ and $F_{N+1}$.

If there is a pair of frames at times N and N+1, and it is necessary to obtain an intermediate frame, for example, an interpolated frame, at time N+α (where α is the interpolation phase: for example, N+0.5), then a pair of reference frames N and N+1 is called the current pair, a pair of frames N−1 and N is called the previous pair, a pair of frames N+1 and N+2 is called the next pair. Motion fields between frames of each pair are called accordingly.

In addition, at this step S104, each motion vector is assigned a corresponding value of a motion estimation metric. This value of the motion estimation metric, calculated between frames on a block-by-block basis, is a similarity characteristic between a block of one frame and a corresponding area of another frame. In embodiments, the motion estimation metric can be referred to as a measure of confidence in the motion vector of the block and is a number that characterizes accuracy of the found vector. The motion estimation metric can be, but without the limitation, the mean absolute difference (MAD) or the sum of absolute differences (SAD). At the same time, it should be clear that lower SAD or MAD values correspond to a higher accuracy of motion estimation, i.e. a higher similarity of parts of frames or a higher measure of confidence in the found motion vector.

Figure 4A:
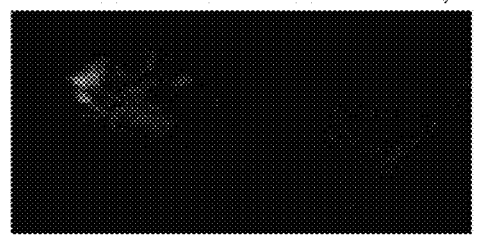
FIGS. 4A to 4H illustrate graphical representations of data obtained as a result of performing the steps of the video FRC-method according to an embodiment.
Figure 4B:
Figure 4B:

FIG. 4A illustrates a graphical representation of the motion estimation metric, which is obtained for the pair of frames of the processed video. Black areas correspond to areas of the background where there is no motion (i.e., high similarity between the block of one frame and the corresponding area of the other frame: i.e., high value of the motion estimation metric), and the lighter areas correspond to the foreground object with complex motion (i.e., lower similarity between the block of one frame and the corresponding area of the other frame: i.e., lower value of the motion estimation metric). It is clear that the probability of an artifact appearing in lighter areas is higher than in darker areas.

Figure 2:
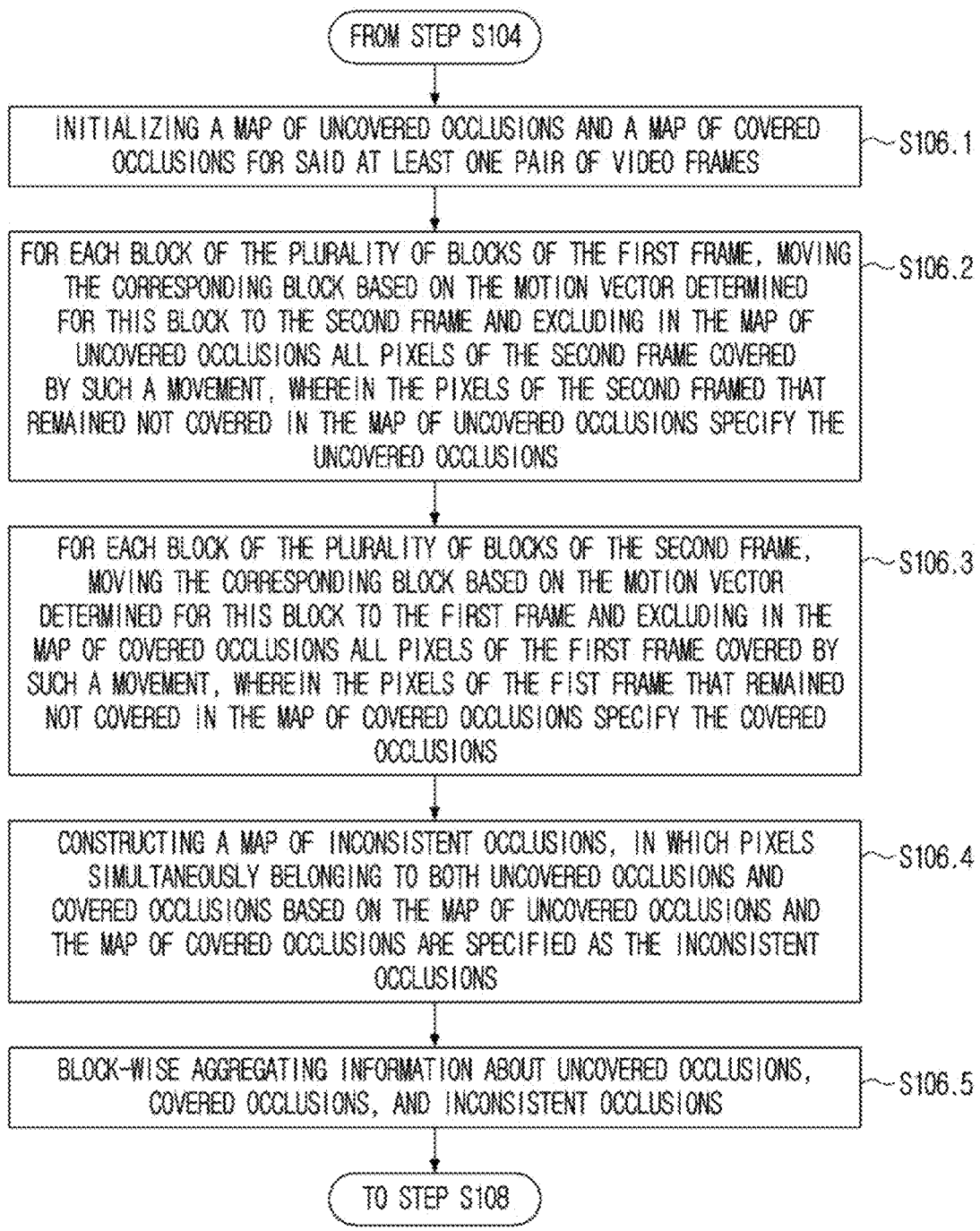
FIG. 2 illustrates a flowchart of obtaining occlusions based on motion fields according to an embodiment.

After the motion estimation between frames on a block-by-block basis is done, the method proceeds to step S106, at which information about occlusions is obtained based on the forward motion field and the backward motion field. An example of a more detailed sequence of steps for obtaining occlusions based on the motion fields according to embodiments is shown in FIG. 2.

Obtaining occlusions based on the forward motion field and the backward motion field begins with step S106.1, at which a map of uncovered occlusions, $UncoverMap_{N+1}$, and a map of covered occlusions, $CoverMap_N$ are initialized for the processed pair of video frames. Said initialization represents generation of the occlusion maps of the same sizes as the size of the processed frames, and setting the values of all pixels of these maps to the same value (either 0 or 1). A covered occlusion: a part of a background of a previous frame is covered (the part is not visible in a next frame) due to displacement of a front object. An uncovered occlusion: a part of a background of a next frame uncovers (the part is not visible in a previous frame) due to displacement of a front object.

Figure 7:
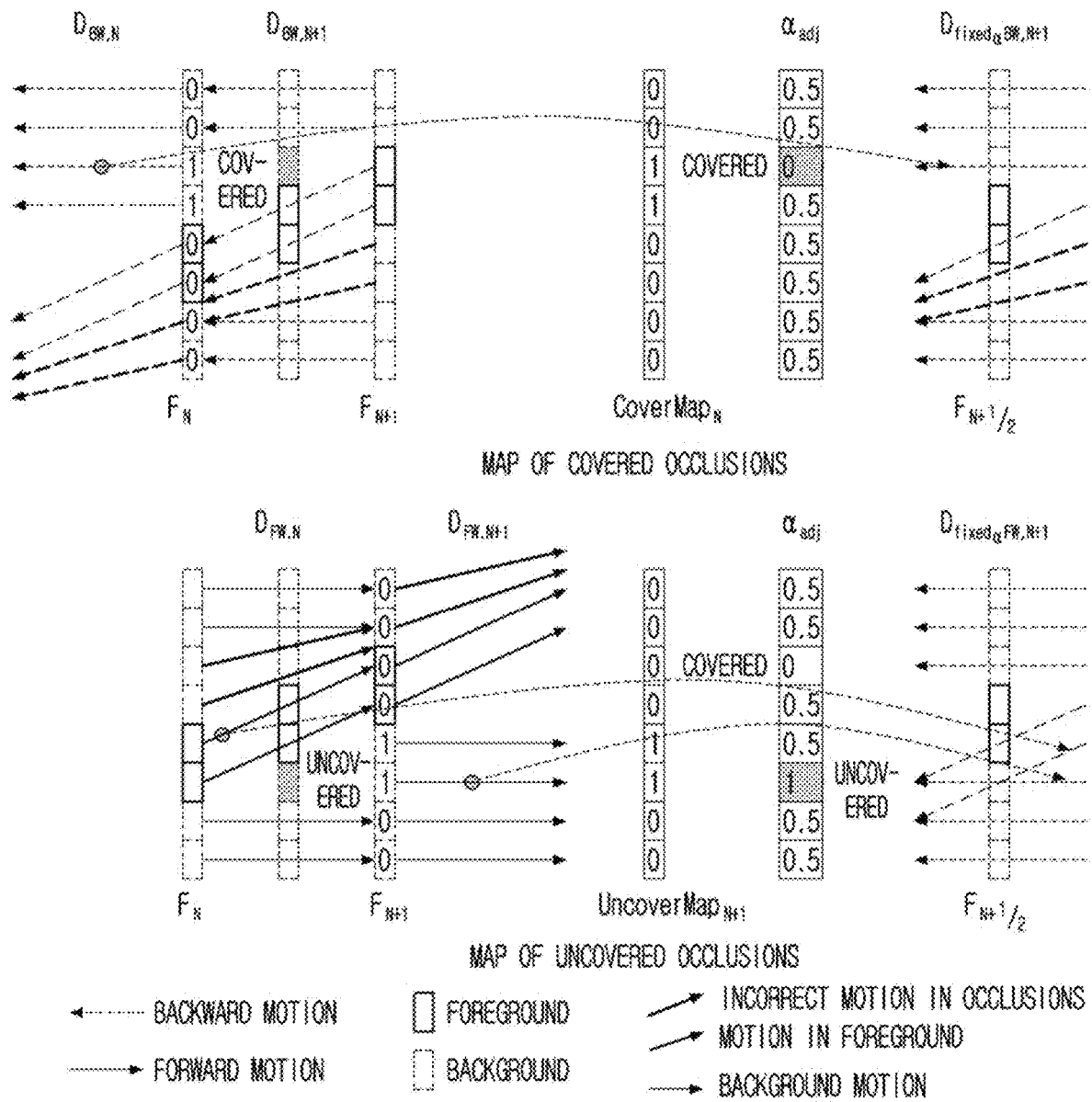
FIG. 7 schematically illustrates construction of a map of uncovered occlusions and a map of covered occlusions according to an embodiment.

After the occlusion maps are initialized, steps S106.2 and S106.3 are performed. The following designations correspond to the designations shown in FIG. 7, to which the additional reference is currently being made to illustrate the following explanations. On FIG. 7 for clarity of description, motion vectors for each pixel and arbitrary block size are illustrated.

At step S106.2, for each block of the plurality of blocks of the first frame $F_N$, each pixel of the corresponding block is moved based on a motion vector determined for this block to the second frame $F_{N+1}$ and all pixels of the second frame covered by such a movement are excluded in the map of uncovered occlusions. Said exclusion is implemented by marking pixels of the second frame that remained not covered in the pixel-by-pixel map of uncovered occlusions, UncoverMap$_{N+1}$, with the value (in the example in FIG. 7, this value is '1') that differs from the value used at step S106.1 when initializing the map.

At step S106.3, for each block of the plurality of blocks of the second frame $F_{N+1}$, each pixel of the corresponding block is moved based on a motion vector determined for this block to the first frame $F_N$ and all pixels of the first frame covered by such a movement are excluded in the map of covered occlusions, CoverMap$_N$. Said exclusion is implemented by marking pixels of the first frame that remained not covered in the map of covered occlusions, CoverMap$_N$, with the value (in the example in FIG. 7, such a value is '1') that differs from the value used at step S106.1 when initializing the map.

Figure 4C:
Figure 4D:

At step S106.4, a map of inconsistent occlusions, InconsistentMap (not shown in FIG. 7) is constructed, in which pixels simultaneously belonging to both uncovered occlusions and covered occlusions based on the map of uncovered occlusions, UncoverMap$_{N+1}$, and the map of covered occlusions, CoverMap$_N$, are specified as the inconsistent occlusions. Similarly to the map of uncovered occlusions, UncoverMap$_{N+1}$, and the map of covered occlusions, CoverMap$_N$, the map of inconsistent occlusions, InconsistentMap$_{N,N+1}$, is first initialized to the same value (either 0 or 1), and then the inconsistent occlusions in this map are marked with the value different from the value used at the step (not shown in FIG. 2) for initializing the map. FIG. 4D shows a graphical representation of the obtained information about pixel-by-pixel occlusions for the processed pair of video frames. Light areas correspond to areas in which no occlusions between frames are detected, darker areas correspond to uncovered occlusions, even darker areas correspond to inconsistent occlusions, and black areas correspond to covered occlusions. In the following, when constructing an artifact probability metric, APM(x,y), for intermediate frames between N and N+1, used are aggregated maps of: uncovered occlusions, UncoverMap$_{N+1}$, covered occlusions, CoverMap$_N$, inconsistent occlusions, InconsistentMap$_{N,N+1}$.

At step S106.5 information about uncovered occlusions, covered occlusions, and inconsistent occlusions is block-wise aggregated for obtaining the information about occlusions for the processed pair of video frames. For example, when aggregating, all the values belonging to pixels of one block located on a regular grid of blocks in a particular map are summed up. In the following description, block-wise aggregated maps are named without indexes, as Covered, Uncovered, Inconsistent.

In embodiments, information about occlusions, an example of a graphical representation of which is shown in FIG. 4D, is obtained from an external occlusion detection unit. Thus, embodiments may be able to cooperate with an external occlusion detection algorithm. In another possible embodiment, processing of occlusions for FRC can be implemented using deep learning, which is disclosed in Russian patent application No. 2020132721, the contents of which are incorporated herein by reference in its entirety.

Returning to FIG. 1, after obtaining information about the occlusions, the method proceeds to step S108, at which the artifact probability metric indicating the probability of appearance of an artifact when performing motion-compensated frame interpolation between the first frame and the second frame is calculated according to the following Equation 1:

$$APM(x,y)=H(mv\_break(x,y))*Omul(x,y)*Mmul(x,y), \quad \text{(Equation 1)}$$

In Equation 1, APM(x,y) may denote the artifact probability metric for the block with coordinates (x,y), H(x) may denote the Heaviside step function, where H(x)=0 for x≤0, H(x)=1 for x>0, mv_break(x,y) may denote the break between motion vectors of spatially adjacent blocks, Omul (x,y) may denote the weighting factor associated with aggregated occlusion maps, and Mmul(x,y) may denote the weighting factor associated with the motion estimation metric.

Figure 3:
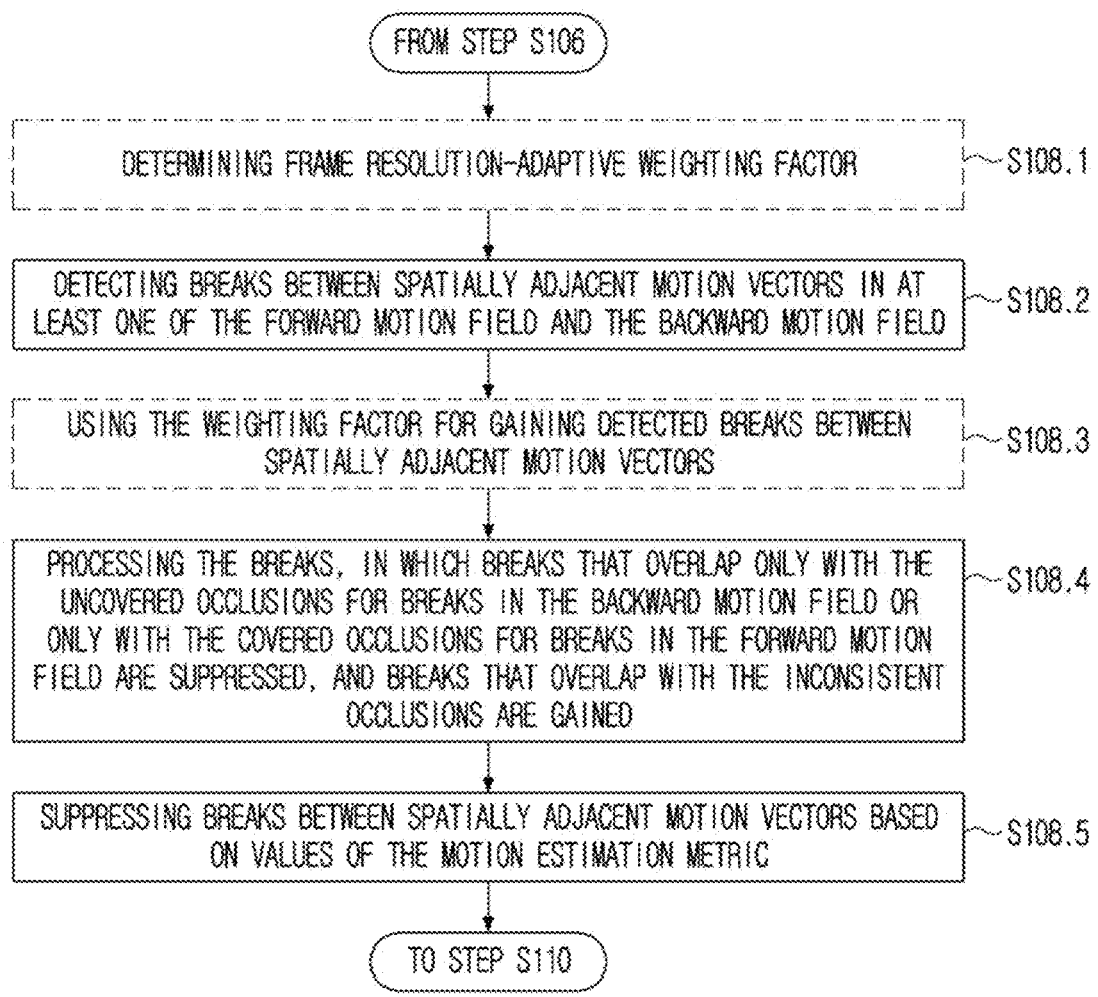
FIG. 3 illustrates a flowchart of calculating an artifact probability metric according to an embodiment.

An example of a more detailed sequence of steps for calculating the artifact probability metric is shown in FIG. 3.

The calculation of the artifact probability metric begins with step S108.2, at which breaks are detected between spatially adjacent motion vectors in the at least one of the forward motion field and backward motion field. Breaks between motion vectors can be detected for vertically spatially adjacent blocks of the frame or for horizontally spatially adjacent blocks of the frame.

For horizontally spatially adjacent blocks (x,y) and (x+1, y) of the frame, the break, mv_break$_h$(x,y), is calculated according to the following Equation 2:

$$mv\_break_h(x,y)=\max(\|MV_{N\to N+1}(x,y)-MV_{N\to N+1}(x+1,y)\|_2-K_{nobreak},0) \quad \text{(Equation 2)}$$

In Equation 2, $MV_{N\to N+1}(x,y)$ may denote the motion vector of the block (x,y), $MV_{N\to N+1}(x+1,y)$ may denote the motion vector of the block (x+1,y), and $K_{nobreak}$ may denote a predetermined 'no break' threshold value. Particular value of $K_{nobreak}$ depends on the block size. In one non-limiting example for the 8×8 block size: $K_{nobreak}=4$. In general, $K_{nobreak}$ can be defined, but without the limitation, as follows $K_{nobreak}=\min(h/2, w/2)$, where h is the height of a block and w is the width of the block.

For vertically spatially adjacent blocks (x,y) and (x,y+1) of the frame, the break, mv_break$_v$(x,y), is calculated according to the following Equation 3:

$$mv\_break_v(x,y)=\max(\|MV_{N\to N+1}(x,y)-MV_{N\to N+1}(x,y+1)\|_2-K_{nobreak},0) \quad \text{(Equation 3)}$$

In Equation 3, $MV_{N\to N+1}(x,y)$ may denote the motion vector of the block (x,y), $MV_{N\to N+1}(x,y+1)$ may denote the motion vector of the block (x,y+1), and $K_{nobreak}$ may denote a predetermined 'no break' threshold value. Particular value of $K_{nobreak}$ depends on the block size. In one non-limiting example for the 8×8 block size: $K_{nobreak}=4$. The point is that a break of less than half the linear block size can be ignored. $K_{nobreak}$ can be varied from 25% to 100% of the smallest linear size of the block.

Thus, breaks between spatially adjacent motion vectors are calculated and suppressed for each block separately. Then, when the breaks are counted in each block, within each block the horizontal and vertical breaks are summed and normalized. These summed values are then smoothed. These calculations will be described in more detail below.

In the above Equations 2 and 3, adjacent motion vectors are taken from the same forward motion field $DW_{FW,N \to N+1}$. For the backward motion field $DW_{BW,N+1 \to N}$, the breaks between the motion vectors of vertically spatially adjacent blocks of the frame and/or horizontally spatially adjacent blocks of the frame can be calculated similarly to the above Equations 2 and 3. FIG. 4C shows a graphical representation of the detected breaks between spatially adjacent motion vectors in the backward motion field.

After breaks between spatially adjacent motion vectors in at least one of the forward motion field and backward motion field are detected, step S108.4 is performed at which the breaks are processed, said processing comprises suppression of breaks that overlap only with uncovered occlusions for breaks in the backward motion field or only with covered occlusions for breaks in the forward motion field, and amplifying breaks that overlap with inconsistent occlusions.

Processing the breaks for suppressing breaks in the forward motion field, which overlap with the covered occlusions, and amplifying breaks that overlap with the inconsistent occlusions, comprises multiplying a corresponding value of the artifact probability metric by a weighting factor Omul(x,y) having a range [0,1] (as shown for example in Equation 1), a value of which decreases when a covered occlusion is detected and increases with an increase in a number of inconsistent occlusions and/or a decrease in a number of covered occlusions. The weighting factor Omul (x,y) in this case can be determined according to the following Equation 4:

$$O_{mul} = \begin{cases} 1, \text{arg} \leq 0 \\ 0, \text{arg} \geq K1_{Omul} \\ 1 - \frac{\text{arg}}{K1_{Omul}}, 0 < \text{arg} < K1_{Omul} \end{cases}$$ (Equation 4)

$$\text{arg} = \frac{\text{Covered}(x, y) + \text{Covered}(x+1, y)}{2} -$$

$$K2_{Omul} \cdot \max(\text{Inconsistent}(x, y) + \text{Inconsisntent}(x+1, y))$$

In Equation 4, Covered(x,y) may denote the number of covered occlusions in the block with coordinates (x,y), Inconsistent(x,y) may denote the number of inconsistent occlusions in the block with coordinates (x,y), $K2_{Omul} \geq 1$ may denote the factor to gain the significance of inconsistent occlusions. In one embodiment $K2_{Omul}=4$ is used for 8×8 block. This means that if more than ¼ of all pixels in a block are marked as the inconsistent occlusion, then $O_{mul}=1$, that is, suppression for this block will not be performed. Therefore, it should be clear that a particular value of the factor $K2_{Omul}$ in other embodiments and for other block sizes may be equal to a value that is greater or less than 4.

$K1_{Omul}$ is the number of covered occlusions in the block in the range having a range [(number of pixels in a block/3), (number of pixels in the block)] minus inconsistent occlusions gained by the factor $K2_{Omul}$ with which the break should be completely suppressed. In one embodiment $K1_{Omul}=40$ is used for 8×8 block. This means that there shall be more than 62.5% of covered occlusions in 8×8 block, with no inconsistent occlusions, for the break to be completely suppressed. Therefore, it should be clear that a particular value of the factor $K1_{Omul}$ in other embodiments and for other block sizes may be equal to a value that is greater or less than 40.

In other embodiments, the value of the weighting factor Omul(x,y) can be determined by other mathematical dependencies, subject to the condition of increasing the factor when the number of inconsistent occlusions increases or when there are no inconsistent occlusions, and reducing the factor when the number of occlusions of one type with an insignificant number of inconsistent occlusions.

Processing the breaks for suppressing breaks in the backward motion field, which overlap with the uncovered occlusions, and amplifying breaks that overlap with the inconsistent occlusions, comprises multiplying a corresponding value of the artifact probability metric by a weighting factor Omul(x,y) having a range [0,1] (as shown for example in Equation 1), a value of which decreases when a uncovered occlusion is detected and increases with an increase in a number of inconsistent occlusions and/or a decrease in a number of uncovered occlusions. The weighting factor Omul (x,y) in this case can be determined according to the following Equation 5:

$$O_{mul} = \begin{cases} 1, \text{arg} \leq 0 \\ 0, \text{arg} \geq K1_{Omul} \\ 1 - \frac{\text{arg}}{K1_{Omul}}, 0 < \text{arg} < K1_{Omul} \end{cases}$$ (Equation 5)

$$\text{arg} = \frac{\text{Uncovered}(x, y) + \text{Uncovered}(x+1, y)}{2} -$$

$$K2_{Omul} \cdot \max(\text{Inconsistent}(x, y) + \text{Inconsistent}(x+1, y))$$

In Equation 5, Uncovered(x,y) may denote the number of uncovered occlusions in the block with coordinates (x,y), Inconsistent(x,y) may denote the number of inconsistent occlusions in the block with coordinates (x,y), $K1_{Omul}$, $K2_{Omul}$ can take the same numerical values as in Equation 4.

In embodiments, weighting factors Omul(x,y) can be determined taking into account the occlusions of vertically arranged blocks. Then the above Equations 4 and 5 can be modified as shown in Equation 6 and Equation 7 below:

$$O_{mul} = \begin{cases} 1, \text{arg} \leq 0 \\ 0, \text{arg} \geq K1_{Omul} \\ 1 - \frac{\text{arg}}{K1_{Omul}}, 0 < \text{arg} < K1_{Omul} \end{cases}$$ (Equation 6)

$$\text{arg} = \frac{\text{Covered}(x, y) + \text{Covered}(x, y+1)}{2} -$$

$$K2_{Omul} \cdot \max(\text{Inconsistent}(x, y) + \text{Inconsisntent}(x, y+1))$$

$$O_{mul} = \begin{cases} 1, \text{arg} \leq 0 \\ 0, \text{arg} \geq K1_{Omul} \\ 1 - \frac{\text{arg}}{K1_{Omul}}, 0 < \text{arg} < K1_{Omul} \end{cases}$$ (Equation 7)

$$\text{arg} = \frac{\text{Uncovered}(x, y) + \text{Uncovered}(x, y+1)}{2} -$$

$$K2_{Omul} \cdot \max(\text{Inconsistent}(x, y) + \text{Inconsisntent}(x, y+1))$$

Figure 6:
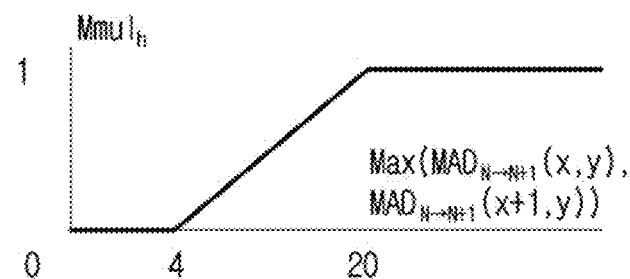
FIG. 6 illustrates graphs showing dependencies of a weighting factor used in calculating artifact probability metric according to an embodiment.
Figure 6:
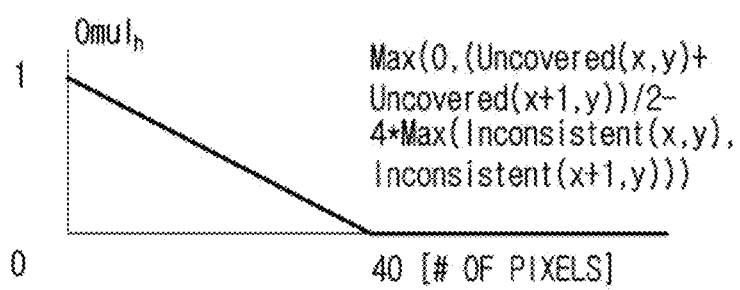
Figure 6:
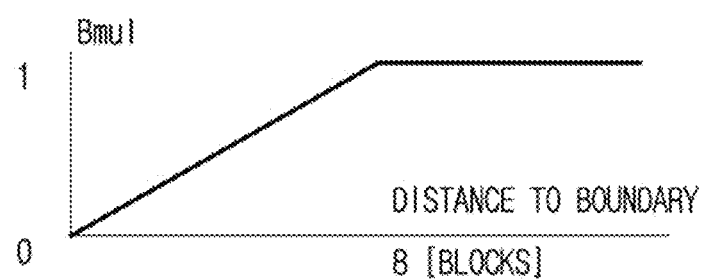

The above-described dependency of the value of the weighting factor Omul(x,y) having a range [0,1] from the number of occlusions is illustrated in the middle graph in FIG. 6. As illustrated in the middle graph in FIG. 6, the value of the weighting factor Omul(x,y) is determined to be 1 (which corresponds to the complete absence of suppression/amplification) when the number of occlusions is 0. In addition, as shown in FIG. 6, the value of the weighting factor Omul(x,y) is determined to be 0 (which corresponds to complete suppression/amplification) when the number of occlusions is greater than or equal to the occlusion number threshold value that is equal to, in the non-limiting example shown, 40. As noted above, in other embodiments, the value of the weighting factor Omul (x,y) can be determined to be 0 with an occlusion number threshold value that is higher or lower than 40. In addition, it should be clear that the dependency of the weighting factor Omul (x,y) and the corresponding occlusion number threshold values can be determined by changing the corresponding slope parameter of the straight line shown in the middle graph in FIG. 6.

Figure 4E:
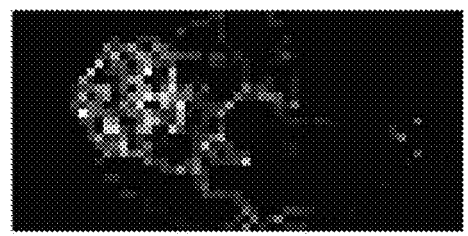

FIG. 4E shows a graphical representation of the results of processing breaks at step S108.4, which were detected at step S108.2. If we compare FIG. 4E (after processing) with FIG. 4C (before processing), we can see that the processing of breaks at step S108.4 led to the fact that the part of the breaks in the frame area, which is closer to the lower boundary of the frame (under the palm of the hand shown in the frame), is suppressed because the probability of an artifact appearing in this area is low, i.e. this area corresponds to the background area of the frame, in which there is no motion or it is minimal. At the same time, it can be noticed that the part of the breaks in the other area of the frame, which corresponds to the palm of the hand shown in the frame, is gained, because the probability of an artifact appearing in this area is high, because in fact this area corresponds to the foreground area, i.e. rapid and/or non-linear motion is highly likely in this area.

After the breaks are processed at step S108.4, the method proceeds to step S108.5, at which breaks between spatially adjacent motion vectors are suppressed based on values of the motion estimation metric of these adjacent motion vectors: The suppression itself at this step is implemented by multiplying the corresponding value of the artifact probability metric by the weighting factor Mmul(x,y) [0 . . . 1] (as shown, for example, in Equation 1) that decreases as a maximum value of the values of the motion estimation metric in a considered pair of motion vectors increases, going to zero when a first predetermined threshold value of the motion estimation metric is reached (in the non-limiting example in the top graph in FIG. 6, the first predetermined threshold value of the motion estimation metric is 4), and increases as the maximum value of the values of the motion estimation metric in the considered pair of motion vectors decreases, going to one when a second predetermined threshold value of the motion estimation metric is reached (in the non-limiting example in the top graph in FIG. 6, the second predetermined threshold value of the motion estimation metric is 20). In addition, it should be clear that the dependency of the weighting factor Mmul(x,y) and the corresponding first predetermined threshold value of the motion estimation metric and the second predetermined threshold value of the motion estimation metric can be determined by changing the corresponding slope parameter of the straight line shown in the top graph in FIG. 6.

It should be clear that because lower values of the motion estimation metric correspond to higher accuracy of the motion estimation, i.e., higher similarity of parts of frames or higher measure of confidence in the found motion vector, given the lower values of the motion estimation metric the weighting factor Mmul(x,y) is determined to be lower (i.e., closer to 0) for suppressing the corresponding break, because the probability of an artifact appearing in this area with high accuracy of motion estimation will be low. On the contrary, because higher values of the motion estimation metric correspond to lower accuracy of the motion estimation, i.e., lower similarity of parts of frames or lower measure of confidence in the found motion vector, given the higher values of the motion estimation metric the weighting factor Mmul(x,y) is determined to be higher (i.e., closer to 1) for not suppressing the corresponding break, because the probability of an artifact appearing in this area with low accuracy of motion estimation will be high.

In the case of using the mean absolute difference (MAD) as the motion estimation metric, the weighting factor Mmul (x,y) can be determined according to the following Equation 8:

$$M_{mul}(x, y) = \begin{cases} 0, \arg \leq K1_{Mmul} \\ 1, \arg \geq K2_{Mmul}, \\ \dfrac{\arg - K1_{Mmul}}{K2_{Mmul}}, K1_{Mmul} < \arg < K2_{Mmul} \end{cases} \quad \text{(Equation 8)}$$

$$\arg = \max(MAD_{N \to N+1}(x, y), MAD_{N \to N+1}(x+1, y))$$

where $MAD_{N \to N+1}(x,y)$ is the value of the mean absolute difference for the motion vector from the forward motion field in the block with coordinates (x,y):

where $MAD_{N \to N+1}(x+1,y)$ is the value of the mean absolute difference for the motion vector from the forward motion field in the block with coordinates (x+1,y), $K1_{Mmul}$ is the predetermined threshold value of the mean absolute difference, if the averaged values of the mean absolute difference of both blocks are less than this value, then the break is suppressed completely, i.e. Mmul(x, y)=0. $K1_{Mmul}$ can lie in the range from 0 to a maximum possible mean absolute difference. It is advisable to choose $K1_{Mmul}$ depending on the noise level in the frame or video sequence. The higher the noise amplitude, the greater the value $K1_{Mmul}$. In one embodiment $K1_{Mmul}=4$ is used for low-noise video. Nonetheless, it should be clear that a particular value of the factor $K1_{Mmul}$ in other embodiments and for other block sizes may be equal to a value that is greater or less than 4.

$K2_{Mmul}$ is the predetermined threshold value of the mean absolute difference, if the averaged values of the mean absolute difference of both blocks are greater than this value, then the break is not suppressed, that is Mmul(x, y)=1. $K2_{Mmul}$ should be larger than $K1_{Mmul}$ and lie in the same possible range. It is advisable to choose $K2_{Mmul}$ depending on the sensitivity of a person to a change in brightness or depending on the average contrast of the frame. In one embodiment, $K2_{Mmul}=20$ is used for contrast frames, because a 20-level difference in brightness (with the maximum brightness of 256) is clearly visible to humans. Nonetheless, it should be clear that a particular value of the factor $K2_{Mmul}$ in other embodiments and for other block sizes may be equal to a value that is greater or less than 20.

In the case of using the sum of absolute differences (SAD) as the motion estimation metric, the weighting factor Mmul (x,y) can be determined according to the following Equation 9:

$$M_{mul}(x, y) = \begin{cases} 0, & \arg \leq Ks1_{Mmul} \\ 1, & \arg \geq Ks2_{Mmul}, \\ \dfrac{\arg - Ks1_{Mmu}}{Ks2_{Mmul}}, & Ks1_{Mmul} < \arg < Ks2_{Mmul} \end{cases} \quad \text{(Equation 9)}$$

$$\arg = \max(SAD_{N \to N+1}(x, y), SAD_{N \to N+1}(x+1, y))$$

where $SAD_{N \to N+1}(x,y)$ is the value of the sum of absolute differences for the motion vector from the forward motion field in the block with coordinates (x,y);

$SAD_{N \to N+1}(x+1,y)$ is the value of the sum of absolute differences for the motion vector from the forward motion field in the block with coordinates (x+1,y);

$Ks1_{Mmul}$ and $Ks2_{Mmul}$ have the same semantic meaning as the factors $K1_{Mmul}$ and $K2_{Mmul}$ and their values are predetermined based on the same considerations. For example, the following factors can be used:

$Ks1_{Mmul}$=(Number of pixels in block)·$K1_{Mmul}$, and $Ks2_{Mmul}$=(Number of pixels in block)·$K2_{Mmul}$.

In embodiments, weighting factors Mmul(x,y) can be determined taking into account differences in motion vectors of vertically arranged blocks. Then the above Equations 6 and 7 can be modified as Equation 10 and Equation 11 below:

$$M_{mul}(x, y) = \begin{cases} 0, & \arg \leq K1_{Mmul} \\ 1, & \arg \geq K2_{Mmul}, \\ \dfrac{\arg - K1_{Mmul}}{K2_{Mmul}}, & K1_{Mmul} < \arg < K2_{Mmul} \end{cases} \quad \text{(Equation 10)}$$

$$\arg = \max(MAD_{N \to N+1}(x, y), MAD_{N \to N+1}(x, y+1))$$

$$M_{mul}(x, y) = \begin{cases} 0, & \arg \leq Ks1_{Mmul} \\ 1, & \arg \geq Ks2_{Mmul}, \\ \dfrac{\arg - Ks1_{Mmul}}{Ks2_{Mmul}}, & Ks1_{Mmul} < \arg < Ks2_{Mmul} \end{cases} \quad \text{(Equation 11)}$$

$$\arg = \max(SAD_{N \to N+1}(x, y), SAD_{N \to N+1}(x, y+1))$$

Figure 4F:
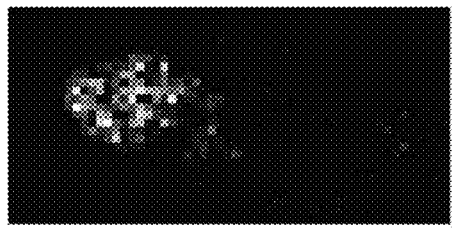

FIG. 4F shows the graphical representation of the results of suppressing the breaks at step S108.5. If we compare FIG. 4F (after breaks are suppressed) with FIG. 4E (with processed breaks), we can notice that performing step S108.5 led to the suppression of almost all breaks in the background area, because the probability of an artifact appearing in this area (when performing motion-compensated frame interpolation) having a high accuracy of motion estimation is low. What is illustrated in FIG. 4F is the graphical representation of the artifact probability metric, APM, calculated at step S108, which indicates the probability of an artifact appearing in motion-compensated frame interpolation between the first frame and the second frame in the block with the coordinates (x,y). The lighter areas in FIG. 4F correspond to higher artifact probability metric, while darker areas correspond to lower artifact probability metric.

Returning to FIG. 1, after the artifact probability metric, APM (x,y), indicating the probability of an artifact appearing in motion-compensated frame interpolation between the first frame and the second frame is calculated, the method proceeds to step S110, at which smoothing filtering is performed on the artifact probability metric. The calculated APM is a highly sensitive detection, however it may be inaccurate due to noise in the input motion vectors. Thus, the calculated APM may also contain a high noise level. In addition, a single break usually does not lead to a noticeable artifact, because one block is a small part of the frame. At the same time, a plurality of blocks with high APM (x,y) in one area clearly indicate the appearance of an artifact. Smoothing filtering on the artifact probability metric, APM, is performed at this step to remove noise and single breaks.

Smoothing filtering on the artifact probability metric is performed by a digital filter, for example, but without the limitation, box filter, Gaussian filter, or any other low-pass filter performing smoothing/blurring. The following aspects of embodiments related to smoothing filtration are described in detail and clearly below with reference to FIG. 5.

Figure 5:
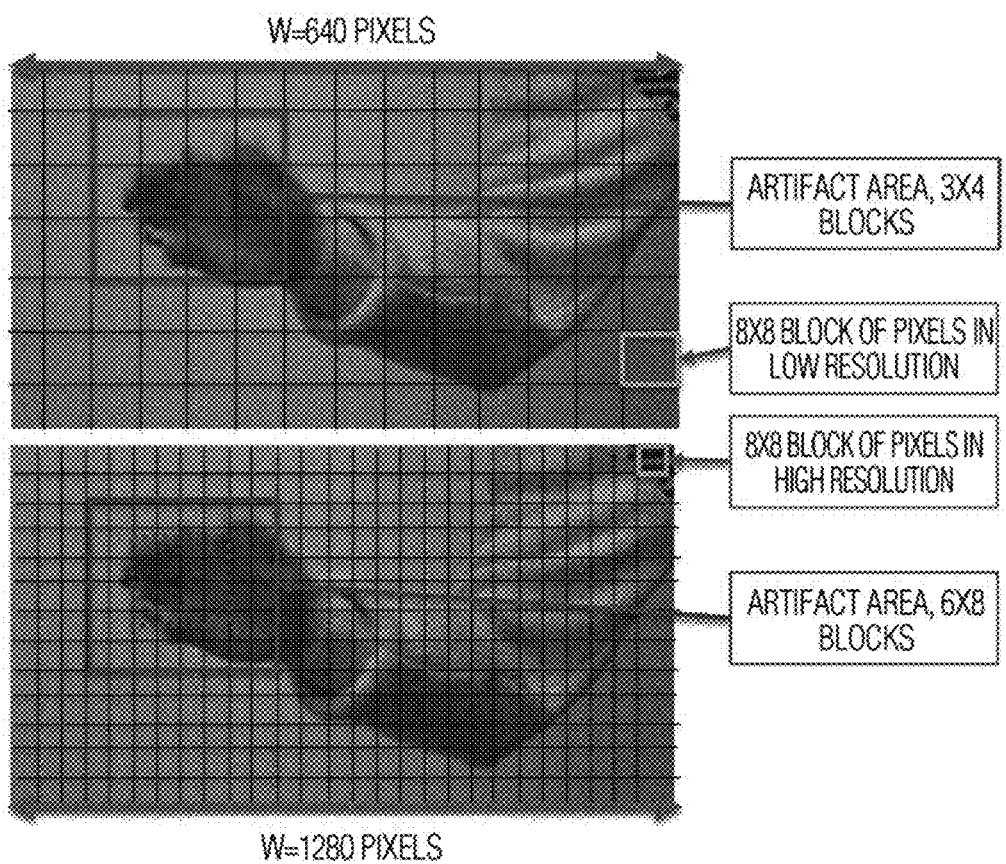
FIG. 5 illustrates dependency of artifact area size on frame resolution.

FIG. 5 shows an example of two frames of the same scene in two different resolutions. The width of the upper image is 640 pixels, the width of the lower image is 1280 pixels. FIG. 5 clearly shows that the a block of 8×8 pixels of the upper image in low resolution captures a larger area of the physical space of the scene than a block of 8×8 pixels of the lower image in high resolution. Accordingly, the size of the artifact area in the upper image in low resolution is 3×4 blocks, while the size of the area of the same artifact in the lower image in high resolution is 6×8 blocks.

In view of the above, embodiments may provide the ability to change the size of the filter used for smoothing filtering adaptively to the resolution of the frame. Embodiments may also provide the ability to change the size of the filter used for smoothing filtering adaptively to the resolution of the frame and to a predetermined minimum size of the detectable artifact. Accordingly, embodiments may increase the versatility of the disclosed video frame rate conversion method (i.e., make it independent of the resolution of the input frames and allow adjustment of the stringency of the parameters with which replacement of motion-compensated frame interpolation with linear combination of adjacent reference frames is selected).

In some embodiment in which the size of the box filter is determined adaptively to the resolution of the frame, the determination can be carried out according to the following Equation 12, according to which the filter area is first obtained:

$$\text{FilterArea} = 4*5*(h*w)/(960*540) \quad \text{(Equation 12)}$$

In Equation 12, FilterArea may denote the filter area in blocks, h may denote the height of the processed frame in pixels, and w may denote the width of the processed frame in pixels.

In embodiments, 960×540 is the base width and height of the frame in pixels, for which the base dimensions of the smoothing filter are set as 4×5. Accordingly, the calculated filter area will increase or decrease proportionally depending on a number of pixels in a processed frame (h,w) relative to the base frame: (h*w)/(960*540). That is, the pixels will leave the dimension, and the blocks (4×5) squared will remain. After the filter area is calculated in blocks, the linear size of the smoothing filter can be calculated by taking the root of the Filter Area.

In the embodiment in which the size of the box filter is determined adaptively to the resolution of the frame and to a predetermined minimum size of detectable artifact, the determination can be carried out according to a modified Equation 8, shown below as Equation 13, according to which the filter area is first obtained:

$$\text{FilterArea} = 4*5*K_{sens\_area}*(h*w)/(960*540) \quad \text{(Equation 13)}$$

In Equation 13, $K_{sens\_area}$ may denote the predetermined minimum size of detectable artifact: $K_{sens\_area} < 1$ for the more artifact-sensitive case in which the best image quality is the priority, and $K_{sens\_area} > 1$ for the less artifact-sensitive case in which the highest processing speed is the priority. The explanations with respect to the base values 4 and 5, 960*540 in Equation 13 are similar to those given above in relation to Equation 12. After the filter area is calculated in blocks according to Equation 13, the linear size of the smoothing filter can be calculated by taking the root of the FilterArea.

Figure 4G:
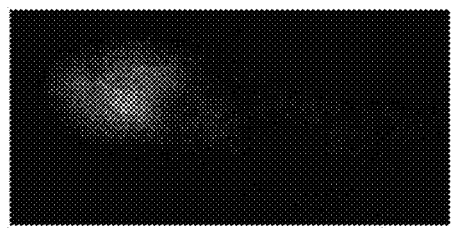
Figure 4H:
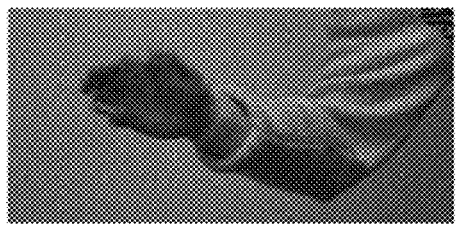

The result of smoothing filtering performed at step S110 is clearly illustrated in FIG. 4G. It can be seen that the noise that was present in the artifact probability metric, APM, and single breaks that will not lead to a noticeable deterioration in the quality of the intermediate frame, have been successfully removed due to the filtering performed. It is this smoothed artifact probability metric, APM, which accurately indicates the artifact area (the area where there is fast and non-linear palm motion in the illustrated example) is used subsequently to obtain intermediate frames.

At step S112, when performing the FRC for the processed pair of frames, one or more intermediate frames are obtained taking into account values of the smoothed artifact probability metric, APM. Thus, the FRC-method described above increases the accuracy of detecting possible artifacts that appear in motion-compensated interpolation and, as a result, increases the accuracy of making a decision (due to a more precise artifact probability metric, APM) in a given situation, whether to perform partial or complete replacement of motion-compensated frame interpolation with linear combination of adjacent reference frames. Finally, the above method is suitable for real-time implementation on devices with limited resources, because most of the data processing is performed on a block-by-block basis.

The following describes exactly how the values of the smoothed artifact probability metric, APM, can be taken into account when obtaining one or more intermediate frames during the FRC. Nevertheless, embodiments are not limited to the procedures described below, because persons of ordinary skill in the art, after reading the following information, will understand other possible procedures. When a maximum value of the smoothed artifact probability metric is greater than or equal to a predetermined global threshold value: max $(APM_{filt}) \geq T_{glob}$, a global linear combination of adjacent reference frames is performed in obtaining one or more intermediate frames at step S112. The global linear combination is the replacement of the interpolated motion-compensated frame $I_t$ with the linear combination (weighted sum) of reference frames $I_0$ and $I_1$ and can be performed according to the following Equation 14:

$$I_t = \alpha \cdot I_0 + (1-\alpha) \cdot I_1, \text{ where } 0 \leq \alpha \leq 1 \quad \text{(Equation 14)}$$

In Equation 14, α may denote the phase used to specify a moment in time for which one or more intermediate frames are obtained, $0 \leq \alpha \leq 1$, the reference frames $I_0$ and $I_1$ are the closest frames in time to said moment in time.

At the same time, when a maximum value of the smoothed artifact probability metric is less than a predetermined global threshold value: max $(APM_{filt}) < T_{glob}$, motion-compensated interpolation of the adjacent reference frames is performed in obtaining one or more intermediate frames at step S112. Motion-compensated frame interpolation of adjacent reference frames can be performed by any method known from the prior art or by any other method that will be developed in the future development of this technology. Non-limiting examples of possible motion-compensated frame interpolation methods are those described in U.S. Pat. No. 8,175,163B2 (SAMSUNG ELECTRONICS CO LTD., published on 16 Dec. 2010), as well as Section 2 of the article titled "ROBUST MOTION-COMPENSATED VIDEO UPCONVERSION" (Olukayode Anthony Ojo and Gerard de Haan Phillips Research Laboratories, Television Systems Group, Prof. Holstlaan 4, 5656 AA Eindhoven, The Netherlands, 1997).

Then, in one exemplary implementation, when it is determined that the motion-compensated interpolation of the adjacent reference frames is to be performed (i.e. max $(APM_{filt}) < T_{glob}$), the method may comprise performing a local linear combination as a weighted sum of an intermediate frame obtained by motion-compensated interpolation and the linear combination of the pair of frames, wherein weights for each block are calculated based on the values of the smoothed artifact probability metric. Therefore, the local linear combination can be performed according to the following Equation 15:

$$I'_t(x,y) = \beta(x,y) \cdot I_t(x,y) + (1-\beta(x,y)) \cdot [\alpha \cdot I_0 + (1-\alpha) \cdot I_1] \quad \text{(Equation 15)}$$

In Equation 15, α may denote the phase used to specify the moment in time for which one or more intermediate frames are obtained, $0 \leq \alpha \leq 1$, the reference frames $I_0$ and $I_1$ are the closest frames in time to said moment in time, $\beta(x,y)=0$ may be set for a block with coordinates (x,y), which in the resulting intermediate frame should be completely obtained by the linear combination of reference frames, and $\beta(x,y)=1$ may be set for a block with coordinates (x,y), which in the resulting intermediate frame should be completely obtained by motion-compensated interpolation: $0 \leq \beta(x,y) \leq 1$. For which block $\beta(x,y)$ should be set close to 0 and for which block $\beta(x,y)$ should be set close to I can be determined based on the value of the smoothed artifact probability metric, $APM_{filt}(x,y)$, for this block. For example, if we first limit the range of values $APM_{filt}(x,y) \in [0 \ldots 1]$, then we can set $\beta(x,y) = 1 - APM_{filt}(x,y)$.

Another condition for performing the local linear combination may be the following. When it is determined that the motion-compensated interpolation of the adjacent reference frames is to be performed (i.e. max$(APM_{filt}) < T_{glob}$), the method may comprise performing the local linear combination for at least some blocks of the adjacent reference frames when: a number of the at least some blocks of the adjacent reference frames having smoothed artifact probability metric, APMfilt, values less than a predetermined local threshold value $T_{highGlobal}$ that is a maximum value of the artifact probability metric with which it is permissible to use a local linear combination does not exceed a predetermined maximum number $T_{local}$ of blocks for which it is permissible to use the local linear combination, said predetermined local threshold value $T_{highGlobal}$ is less than said predetermined global threshold value $T_{glob}$. The operation of the local linear combination itself in this embodiment is performed similarly to Equation 15 above.

In the embodiments, the method may further include determining, at step S108.1, weighting factor adaptive to the frame resolution, and using, at step S108.3, said weighting factor for amplifying the breaks detected at S108.2 between spatially adjacent motion vectors. In this embodiment, the artifact probability metric, APM, can be adjusted using the weighting factor $K_{resolution}$ and the scaling factor $K_{break\_gain}$. Thus, the frame resolution adaptive artifact probability metric can be determined according to a modified Equation 1, show below as Equation 16:

$$APM(x,y) = H(mv\_break(x,y)) * [1 + mv\_break(x,y) \\ * K_{break\_gain} * K_{resolution}] * Mmul * Omul \quad \text{(Equation 16)}$$

In Equation 16, $K_{break\_gain}$ may denote the predetermined scaling factor that makes the dimension of mv_break comparable to the dimension of H(mv_break). In one non-limiting example $K_{break\_gain}=1/32$. That is, the difference in motion vectors in adjacent blocks with the magnitude of $32+K_{nobreak}$ will double the initial value of the break. The initial value is the result of the Heaviside function, i.e. 1. $K_{break\_gain}$ can be changed from 0 to 1/8, thus decreasing or increasing the break gain depending on the magnitude of the difference in motion vectors. For example, it is advisable, but not necessary, to increase $K_{break\_gain}$ on video with small motion amplitudes and decrease on video with complex high amplitude motion. In addition, one can increase $K_{break\_gain}$ for amplifying the break in order to increase the overall sensitivity of artifact probability metric.

$K_{resolution}$ may denote the predetermined frame resolution adaptive weighting factor. In one non-limiting example, the following empirical value $K_{resolution}=\sqrt{(960^2+540^2)/(h^2+w^2)}$ can be used, where h, w are, respectively, the height and width of the frame in pixels.

In another additional embodiment, artifact probability metric is suppressed more strongly, up to complete suppression, when approaching the boundaries of the frame. This feature allows to avoid artifacts that are often appearing at the frame edges, as well as to reduce the frequency of making incorrect decisions about the need for partial or complete replacement of motion-compensated frame interpolation with the linear combination of adjacent reference frames. For these purposes, the calculation at step S108 of the artifact probability metric, APM, may comprise suppressing at step S108.6 breaks that are in frame blocks located at a distance from the frame boundary, which is less than a predetermined distance from the frame boundary in blocks. As shown in the lower graph in FIG. 6, the weighting factor Bmul can be used to adjust the artifact probability metric, APM, by suppressing breaks in frame blocks that are closer to the frame boundary than 8 blocks, however embodiments are not limited thereto. The particular value of the predetermined distance can be greater than 8, or less than 8 blocks. It should be clear that the dependency of the weighting factor Bmul and the corresponding predetermined distance can be determined by changing the corresponding slope parameter of the straight line shown in the lower graph in FIG. 6. In this additional embodiment, the artifact probability metric can be determined according to a Equation 1, shown below as Equation 17:

$$APM(x,y)=H(mv\_break(x,y))*Omul(x,y)*Mmul(x,y)*Bmul(x,y) \quad \text{(Equation 17)}$$

Description above has been provided in terms of the FRC-method according embodiments. In embodiments, each of the steps can be performed by a separate unit intended for this purpose, or some or all of the steps can be performed by the same unit.

Figure 8:
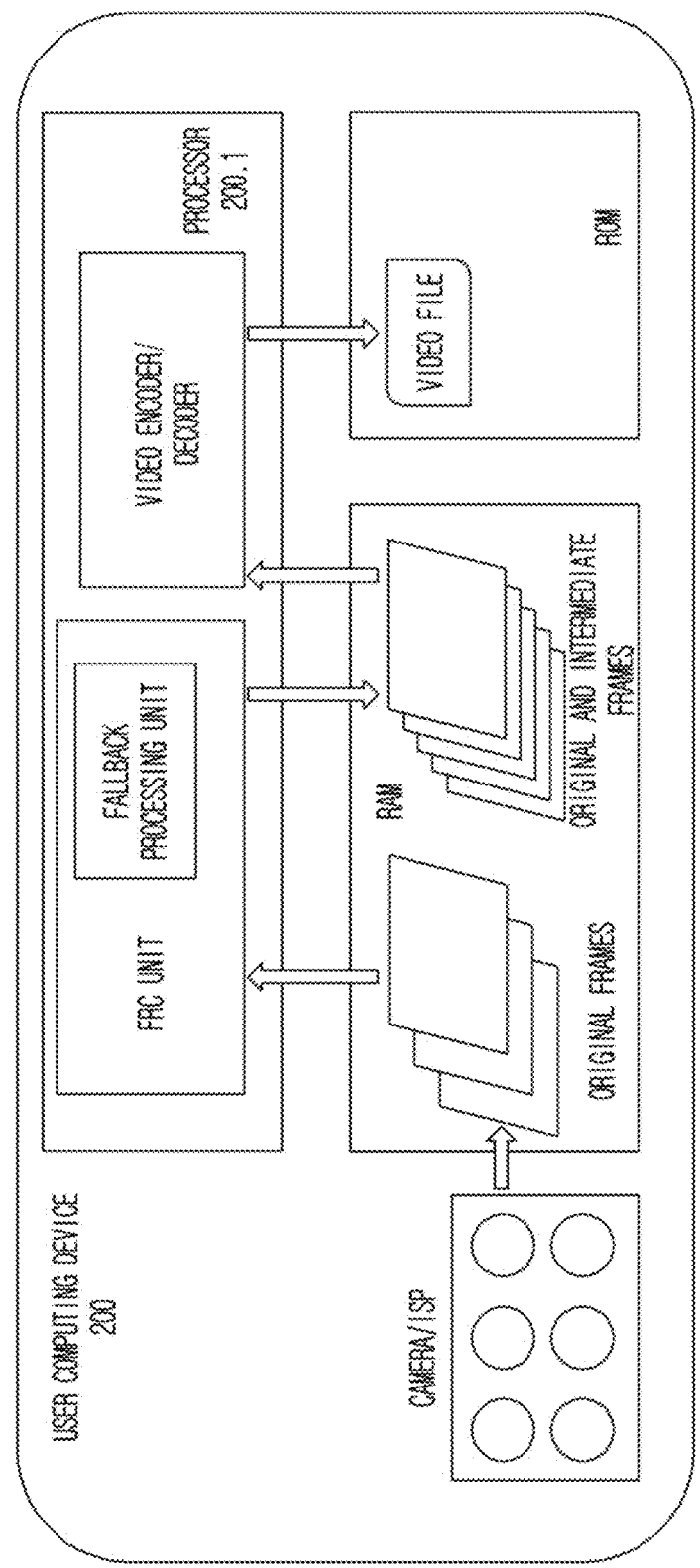
FIG. 8 schematically illustrates a user computing device according to an embodiment.

FIG. 8 schematically illustrates the user computing device 200 according to embodiments. The computing device 200 comprises a camera/ISP, random access memory (RAM), processor 200.1, read-only memory (ROM). The processor 200.1 comprises FRC unit, including a fallback processing unit, and a video encoder/decoder. The FRC unit can be configured to, when executing processor executable instructions, carry out the FRC-method described above with references to FIGS. 1-7. The computing device can be any electronic device, for example, a smartphone, tablet, computer, TV, etc. In the non-limiting scenario of the device operation, which is shown in this figure, the camera receives the original frames, and the FRC unit processes these original frames according to the disclosed method to obtain one or more intermediate frames, taking into account the values of the smoothed artifact probability metric.

The processor 200.1 can invoke and execute computer programs from memory (RAM, ROM) to carry out the FRC-method. ROM or RAM 220 may be a separate device independent of the processor 200.1, or may be integrated into the processor 200.1.

At least one of the steps in the disclosed method or components in the device 200 may use an artificial intelligence (AI) model to perform the corresponding operations. The AI-related function may be performed using ROM, RAM, and the processor 200.1.

The processor 200.1 may include one or more processors. At this time, one or a plurality of processors may be a general-purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU).

The one or more processors control the processing of the input data in accordance with a predefined operating rule or artificial intelligence (AI) model stored in ROM and RAM. The predefined operating rule or artificial intelligence model can be obtained through training. In this case, the processor may perform data preprocessing operation to convert data into a form suitable for being used as input data for the artificial intelligence model.

Here, "being obtained through training" means that, by applying a learning algorithm to a plurality of learning data, a predefined operating rule or AI model of a desired characteristic is made. The training may be performed in a device itself in which AI according to an embodiment is performed, and/or may be implemented through a separate server/system.

The artificial intelligence model may include a plurality of neural network layers. Each layer has a plurality of weighting values, and performs an operation for the layer through calculation on the calculation result of the previous layer and the plurality of weighting values.

Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm is a method for training a predetermined target device (GPU-based neural network) using a plurality of learning data to cause, allow, or control the target device to make determination or prediction. Examples of learning algorithms include, but are not limited to, supervised learning, unsupervised learning, semi-supervised learning, or reinforcement learning.

The various illustrative units and modules described in connection with the disclosure herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor may be a microprocessor, or may be any conventional processor, controller, microcontroller, or state machine. A processor may also be implemented as a combination of computing devices (e.g., a combination of a DSP and a microprocessor, few microprocessors, one or more microprocessors in conjunction with a DSP core, or any other such configuration).

Memory may be volatile or non-volatile memory, or may include both volatile and non-volatile memory. Non-volatile memory can be read-only memory (ROM), programmable read-only memory (PROM), erasable programmable read-only memory (EPROM), electronically erasable programmable read-only memory (EEPROM) or flash memory. Volatile memory can be random access memory (RAM). Also, the memory in the embodiments of this disclosure can be static random access memory (SRAM), dynamic random access memory (DRAM), synchronous dynamic random access memory (synchronous DRAM, SDRAM), synchronous dynamic random access memory with double data rate (SDRAM with double data rate, DDR SDRAM), enhanced synchronous dynamic random access memory (enhanced SDRAM, ESDRAM), synchronous link DRAM (SLDRAM), and direct Rambus random access memory (DR RAM), etc. That is, the memory in the embodiments of this disclosure includes, but is not limited to, these and any other suitable types of memory.

Information and signals described herein can be presented using any of a variety of different technologies. For example, data, instructions, commands, information, signals, bits, bins, symbols and elementary signals, which can be given as an example in the above description, can be represented by means of voltages, currents, electromagnetic waves, magnetic fields or particles, optical fields or particles, or any combination thereof.

Functions described herein may be implemented in hardware, software executed by means of a processor, firmware, or in any combination thereof. When implemented in software executed by means of a processor, functions can be stored or transmitted as one or more instructions or code on a computer-readable medium. Other examples and implementations are within the scope of the disclosure. For example, due to the nature of the software, functions described above may be implemented using software executed by means of a processor, hardware, firmware, fixed unit, or any combinations thereof. Features that implement functions can also be physically separated to different locations, including according to such a distribution that parts of the functions are implemented in different physical locations.

Computer-readable media include both non-transitory computer storage media and a communication carrier, including any transmission carrier that facilitates transfer of a computer program from one place to another. The non-transitory storage medium can be any available medium that can be accessed via a general-purpose or special-purpose computer. As an example, and not the limitation, non-transitory computer-readable media may comprise random access memory (RAM), read-only memory (ROM), electrically erasable programmable read-only memory (EEPROM), flash memory, ROM on compact discs (CD) or other optical disk storage device, a data storage device on magnetic disks or other magnetic storage devices, or any other non-transitory storage medium that can be used to transfer or store the required program code in the form of instructions or data structures, and which can be accessed via a general-purpose or special-purpose computer or a general-purpose or special-purpose processor.

It should be understood that this document discloses the principle of operation and basic examples of the FRC-method and the device implementing it. A person of ordinary skill in the art, using these principles, will be able to obtain other embodiments of the invention without making inventive efforts.

Embodiments may find wide application in video processing, for example, in cases with real-time needs (for example, video playback, video calls, conversion during video capture), in devices with limited computing resources (mobile phones, televisions), and can also easily adapt to new use cases with special requirements for video processing.

Use examples can be the Super-Slow-Motion camera mode (ultra-slow shooting) with the frame rate conversion from 480 to 960 FPS, which allows, for example, shooting in poor lighting conditions or with long exposure: a video editor with frame rate conversion from 240 to 480 FPS, which allows to use slow-down effects in the edited video: interpolation of the gameplay with the frame rate conversion from the original 48 FPS output by the device in the game to 90 FPS, which allows you to smooth the video sequence and improve gameplay experience.

It should be understood that although in this document terms such as "first", "second", "third", etc., may be used to describe various elements, components, areas, layers and/or sections, these elements, components, areas, layers and/or sections should not be limited to these terms. These terms are used only to distinguish one element, component, area, layer or section from another element, component, area, layer or section. Thus, first element, component, region, layer or section can be called the second element, component, region, layer or section without going beyond the scope of the present invention. In this description, the term "and/or" includes any and all combinations of one or more of the corresponding listed items. Elements mentioned in the singular do not exclude the plurality of such elements, unless otherwise specified. In addition, any specific numerical values specified in this application should not be construed as any limitation, because after reading this disclosure, a person one of ordinary skill in the art will understand other possible, adjusted values that can be used. Instead, said particular numerical value should be considered as the mid-range value, which may be equal to, depending on hardware and picture quality requirements, +0.01-40% from said mid-range value.

The functionality of the element specified in the description or the claims as a single element can be implemented in practice by means of several components of the device, and vice versa, the functionality of the elements specified in the description or the claims as several separate elements can be implemented in practice by means of a single component.

In one embodiment, the elements/units of the proposed device are located in a common housing, placed on the same frame/structure/substrate/printed circuit board and connected to each other structurally through assembly (assembly) operations and functionally through communication lines. Said communication lines or channels, unless otherwise specified, may be any type of communication lines, according to embodiments. For example, the communication line can be a wire, a set of wires, a bus, a track, a wireless communication line (inductive, radio frequency, infrared, ultrasonic, etc.).

The functional connection of elements should be understood as a connection that ensures the correct interaction of these elements with each other and the implementation of a particular functionality of the elements. Particular examples of functional communication can be communication with the possibility of data exchanging, communication with the possibility of transmitting electric current, communication with the possibility of transmitting mechanical motion, communication with the possibility of transmitting light, sound, electromagnetic or mechanical vibrations, etc. The specific type of functional connection is determined by the nature of the interaction of the mentioned elements, and, unless otherwise specified, is provided by widely known means using principles widely known in the art.

The elements of the device can be made of any suitable material. These components can be manufactured using known methods, including, as an example only, machining on machine tools, casting according to the smelted model, crystal buildup. Assembly operations, connections and other operations in accordance with the above description also correspond to the knowledge of a person of ordinary skill in the art and, thus, will not be explained in more detail here.

Although exemplary embodiments have been described in detail and shown in the accompanying drawings, it should be understood that such embodiments are illustrative only and are not intended to limit the disclosure, and that embodiments are not limited to the particular configurations and structures shown and described, because various other modifications and embodiments of the invention may be obvious to a person skilled in the art based on the information set forth in the description, without going beyond the scope disclosure.

What is claimed:

1. A video frame rate conversion (FRC) method supporting partial or complete replacement of motion-compensated frame interpolation with linear combination of adjacent reference frames, the method comprising:

obtaining at least one pair of frames of a video which are subject to FRC;

partitioning each frame of the at least one pair of frames into a plurality of blocks;

estimating motion between the at least one pair of frames on a block-by-block basis to obtain:

a forward motion field comprising a set of first motion vectors, wherein each first motion vector from among the set of first motion vectors corresponds to a first block from among a plurality of first blocks of a first frame of the at least one pair of frames, and points to a corresponding area in the second frame, and a backward motion field comprising a set of second motion vectors, wherein each second motion vector from among the set of second motion vectors corresponds to a second block from among a plurality of second blocks of a second frame of the at least one pair of frames, and points to a corresponding area in the first frame, and wherein the each first motion vector the each second motion vector is assigned a corresponding value of a motion estimation metric, the first frame preceding the second frame in time;

obtaining occlusions comprising covered occlusions, uncovered occlusions, and inconsistent occlusions based on the forward motion field and the backward motion field; and calculating an artifact probability metric indicating a probability of an appearance of an artifact in the motion-compensated frame interpolation between the first frame and the second frame, wherein the calculating comprises:

detecting breaks between spatially adjacent motion vectors in at least one of the forward motion field and the backward motion field, processing the breaks by suppressing breaks which overlap only with the uncovered occlusions for breaks in the backward motion field or only with the covered occlusions for breaks in the forward motion field, and amplifying breaks which overlap with the inconsistent occlusions, and suppressing the breaks between the spatially adjacent motion vectors based on values of the motion estimation metric, performing smoothing filtering on the artifact probability metric, and obtaining one or more intermediate frames based on values of the smoothed artifact probability metric, and wherein the suppressing of the breaks comprises multiplying a corresponding value of the artifact probability metric by a weighting factor having a range [0,1], which decreases as a maximum value of the values of the motion estimation metric in a considered pair of motion vectors increases, reaching a value zero based on a first predetermined threshold value of the motion estimation metric being reached, and increases as the maximum value of the values of the motion estimation metric in the considered pair of motion vectors decreases, reaching a value of one based on a second predetermined threshold value of the motion estimation metric being reached.

2. The method of claim 1, wherein based on a maximum value of the smoothed artifact probability metric being greater than or equal to a predetermined global threshold value, the obtaining of the one or more intermediate frames comprises performing a global linear combination of the adjacent reference frames.

3. The method of claim 1, wherein based on a maximum value of the smoothed artifact probability metric being less than a predetermined global threshold value, the obtaining of the one or more intermediate frames comprises performing motion-compensated interpolation of the adjacent reference frames.

4. The method of claim 3, wherein based on determining that the motion-compensated interpolation of the adjacent reference frames is to be performed, the method further comprises:

determining a number of at least some blocks of the adjacent reference frames having smoothed artifact probability metric values which are less than a predetermined local threshold value corresponding to a maximum value of the artifact probability metric which is permissible to use with a local linear combination;

based on the number of the at least some blocks not exceeding a predetermined maximum number of blocks which are permissible to use with the local linear combination, performing a local linear combination for at least some blocks of the adjacent reference frames, wherein the predetermined local threshold value is less than the predetermined global threshold value.

5. The method of claim 3, wherein, based on determining that the motion-compensated interpolation of the adjacent reference frames is to be performed, the method further comprises:

performing a local linear combination as a weighted sum of an intermediate frame obtained by motion interpolation of the at least one pair of frames and the linear combination of the at least one pair of frames, wherein weights for each block are calculated based on the values of the smoothed artifact probability metric.

6. The method of claim 1, wherein based on the estimating of the motion between the at least one pair of frames on the block-by-block basis, the motion estimation metric comprises a similarity characteristic between pixels of a block of one frame and pixels of a corresponding area of another frame, wherein the motion estimation metric comprises a mean absolute difference (MAD) or a sum of absolute differences (SAD), and wherein lower SAD or MAD values correspond to a higher accuracy of the motion estimation metric.

7. The method of claim 1, wherein the obtaining of the occlusions comprises:

initializing a map of the uncovered occlusions and a map of the covered occlusions corresponding to the at least one pair of frames;

for each first block of the plurality of first blocks of the first frame, moving a corresponding block based on a first motion vector determined for the each first block to the second frame and excluding all pixels of the second frame covered by the movement in the map of the uncovered occlusions, wherein remaining pixels of the second frame which are not covered in the map of the uncovered occlusions specify the uncovered occlusions;

for each second block of the plurality of second blocks of the second frame, moving a corresponding block based on a second motion vector determined for the each first block to the first frame and excluding all pixels of the first frame covered by the movement in the map of covered occlusions, wherein remaining pixels of the first frame which are not covered in the map of the covered occlusions specify the covered occlusions;

constructing a map of inconsistent occlusions, in which pixels simultaneously belonging to both the uncovered occlusions and the covered occlusions based on the map of the uncovered occlusions and the map of the covered occlusions are specified as the inconsistent occlusions; and block-wise aggregating information about the uncovered occlusions, the covered occlusions, and the inconsistent occlusions.

8. The method of claim 7, wherein the processing of the breaks comprises:

multiplying the corresponding value of the artifact probability metric by the weighting factor having a range [0,1], which further decreases based on a covered occlusion being detected and increasing with an increase in a number of the inconsistent occlusions and a decrease in a number of the covered occlusions.

9. The method of claim 7, wherein the processing of the breaks comprises:

multiplying the corresponding value of the artifact probability metric by the weighting factor having a range [0,1], which further decreases based on an uncovered occlusion being detected and increases with an increase in a number of the inconsistent occlusions and a decrease in a number of the uncovered occlusions.

10. The method of claim 1, wherein the obtaining of the occlusions comprises receiving information about the occlusions, including the uncovered occlusions, the covered occlusions, and the inconsistent occlusions, which are found based on the forward motion field and the backward motion field, from an external processor.

11. The method of claim 1, further comprising:

determining a weighting factor adaptive to frame resolution; and using the weighting factor to amplify detected breaks between spatially adjacent motion vectors.

12. The method of claim 1, wherein the smoothing filtering on the artifact probability metric is performed by a digital filter having a filter size determined adaptively based on a frame resolution.

13. The method of claim 1, wherein the smoothing filtering on the artifact probability metric is performed by a digital filter having a filter size determined adaptively based on a predetermined minimum size of detectable artifact.

14. The method of claim 1, wherein the calculating of the artifact probability metric further comprises:

suppressing the breaks which are included in frame blocks located at a distance from a frame boundary, which is less than a predetermined distance from the frame boundary in blocks.

15. The method of claim 1, wherein the breaks are detected for vertically spatially adjacent blocks of the frame or for horizontally spatially adjacent blocks of the frame.

16. The method of claim 1, wherein the breaks are detected for vertically spatially adjacent blocks of the frame and for horizontally spatially adjacent blocks of the frame.

17. The method of claim 1, wherein the artifact probability metric is at least partially calculated using a Heaviside function.

18. A device for performing video frame rate conversion (FRC) supporting partial or complete replacement of motion-compensated frame interpolation with a linear combination of adjacent reference frames, the device comprising:

a processor configured to execute stored instructions, to:

obtain at least one pair of frames of a video which are subject to FRC;

partition each frame of the at least one pair of frames into a plurality of blocks;

estimate motion between the frames on a block-by-block basis to obtain:

a forward motion field comprising a set of first motion vectors, wherein each first motion vector from among the set of first motion vectors corresponds to a first block from among a plurality of first blocks of a first frame of the at least one pair of frames, and points to a corresponding area in the second frame, and a backward motion field comprising a set of second motion vectors, wherein each second motion vector from among the set of second motion vectors corresponds to a second block from among a plurality of second blocks of a second frame, and points to a corresponding area in the first frame, and wherein the each first motion vector the each second motion vector is assigned a corresponding value of a motion estimation metric, the first frame preceding the second frame in time;

obtain occlusions comprising covered occlusions, uncovered occlusions, and inconsistent occlusions based on the forward motion field and the backward motion field; and calculate an artifact probability metric indicating a probability of an appearance of an artifact in the motion-compensated frame interpolation between the first frame and the second frame, wherein the calculating comprises:

detecting breaks between spatially adjacent motion vectors in at least one of the forward motion field and the backward motion field, processing the breaks by suppressing breaks which overlap only with the uncovered occlusions for breaks in the backward motion field or only with the covered occlusions for breaks in the forward motion field, and amplifying breaks which overlap with the inconsistent occlusions, and suppressing the breaks between the spatially adjacent motion vectors based on values of the motion estimation metric, performing smoothing filtering on the artifact probability metric, and obtaining one or more intermediate frames based on values of the smoothed artifact probability metric, and wherein the suppressing of the breaks comprises multiplying a corresponding value of the artifact probability metric by a weighting factor having a range [0,1], which decreases as a maximum value of the values of the motion estimation metric in a considered pair of motion vectors increases, reaching a value zero based on a first predetermined threshold value of the motion estimation metric being reached, and increases as the maximum value of the values of the motion estimation metric in the considered pair of motion vectors decreases, reaching a value of one based on a second predetermined threshold value of the motion estimation metric being reached.

* * * * *